(12) United States Patent
Uchida

(10) Patent No.: US 8,244,860 B2
(45) Date of Patent: Aug. 14, 2012

(54) SYSTEM, METHOD, AND COMPUTER-READABLE MEDIUM FOR MANAGING COMMUNICATIONS AMONG SERVICE MODULES

(75) Inventor: Takayuki Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/000,226

(22) PCT Filed: Nov. 1, 2010

(86) PCT No.: PCT/JP2010/069777
§ 371 (c)(1),
(2), (4) Date: Dec. 20, 2010

(87) PCT Pub. No.: WO2011/080967
PCT Pub. Date: Jul. 7, 2011

(65) Prior Publication Data
US 2011/0282987 A1 Nov. 17, 2011

(30) Foreign Application Priority Data
Dec. 28, 2009 (JP) ................................. 2009-298835

(51) Int. Cl.
*G06F 15/173* (2006.01)
(52) U.S. Cl. ........ 709/224; 709/223; 709/225; 709/226; 709/229; 709/238; 709/239
(58) Field of Classification Search .......... 709/223–226, 709/229, 238, 239
See application file for complete search history.

(56) References Cited

U.S. PATENT DOCUMENTS

| | | | |
|---|---|---|---|
| 2003/0135546 A1 * | 7/2003 | Yoshioka | 709/203 |
| 2007/0140263 A1 | 6/2007 | Mitome et al. | 370/395.53 |
| 2008/0263544 A1 | 10/2008 | Amano et al. | 718/1 |
| 2009/0240790 A1 | 9/2009 | Utsunomiya et al. | 709/221 |

FOREIGN PATENT DOCUMENTS

| | | |
|---|---|---|
| JP | 2000-209278 A | 7/2000 |
| JP | 2007-158870 A | 6/2007 |
| JP | 2008-278478 A | 11/2008 |
| JP | 2009-232207 A | 10/2009 |

* cited by examiner

*Primary Examiner* — Brian P Whipple
(74) *Attorney, Agent, or Firm* — Fitzpatrick, Cella, Harper & Scinto

(57) ABSTRACT

A communication method between service modules in a system in which service modules operating on a plurality of information processing apparatuses connected with a network operate in collaboration with each other, the system includes a monitoring apparatus that is provided with a monitor module monitoring a connection between service modules in the system and that has connection management information including identifier information for uniquely identifying an information processing apparatus in which a service module is operating in the system, and connection information including external connection information for the service module to perform communication using an external network between the information processing apparatuses and internal connection information for the service module to perform communication using an internal network of the information processing apparatus.

15 Claims, 18 Drawing Sheets

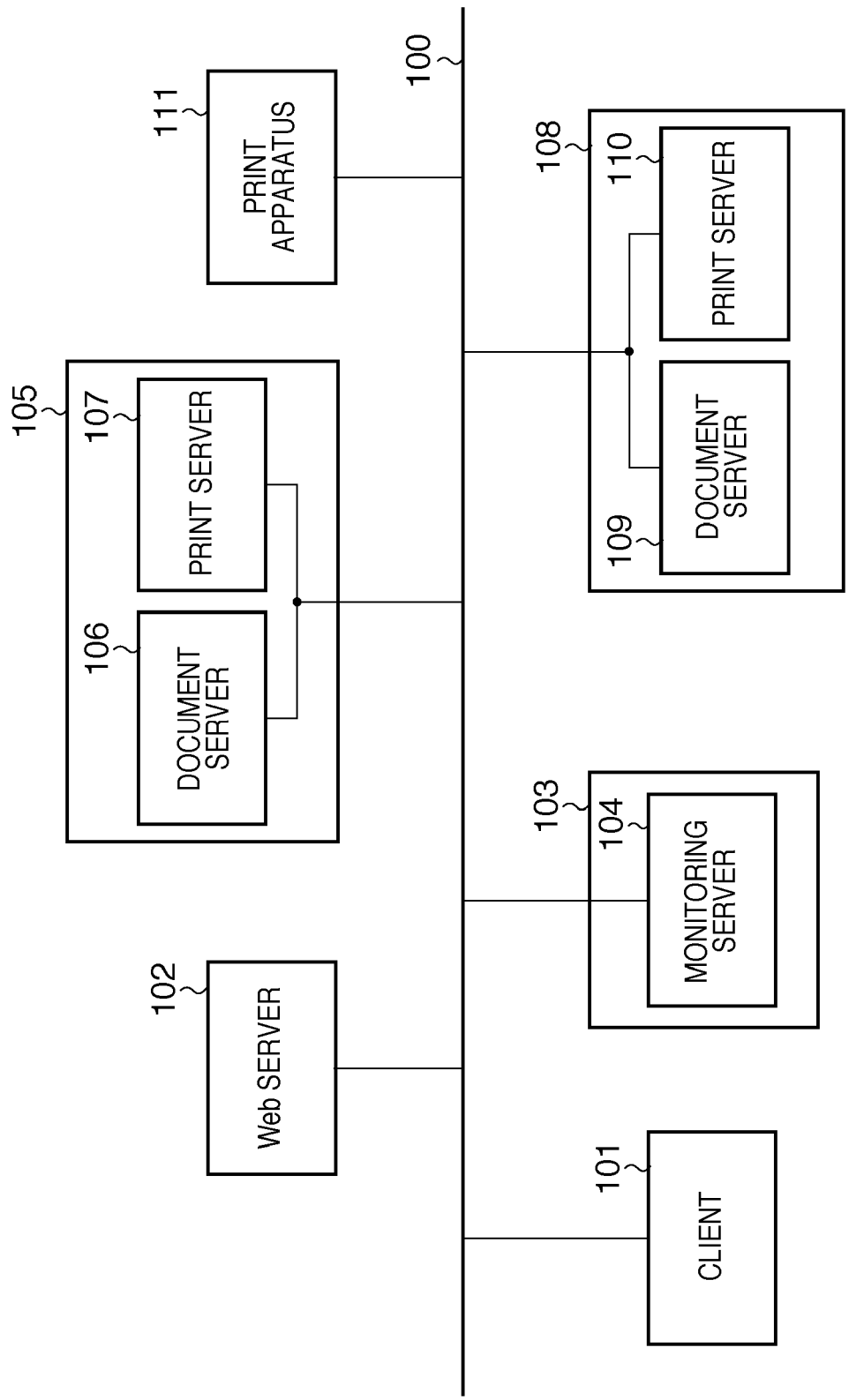

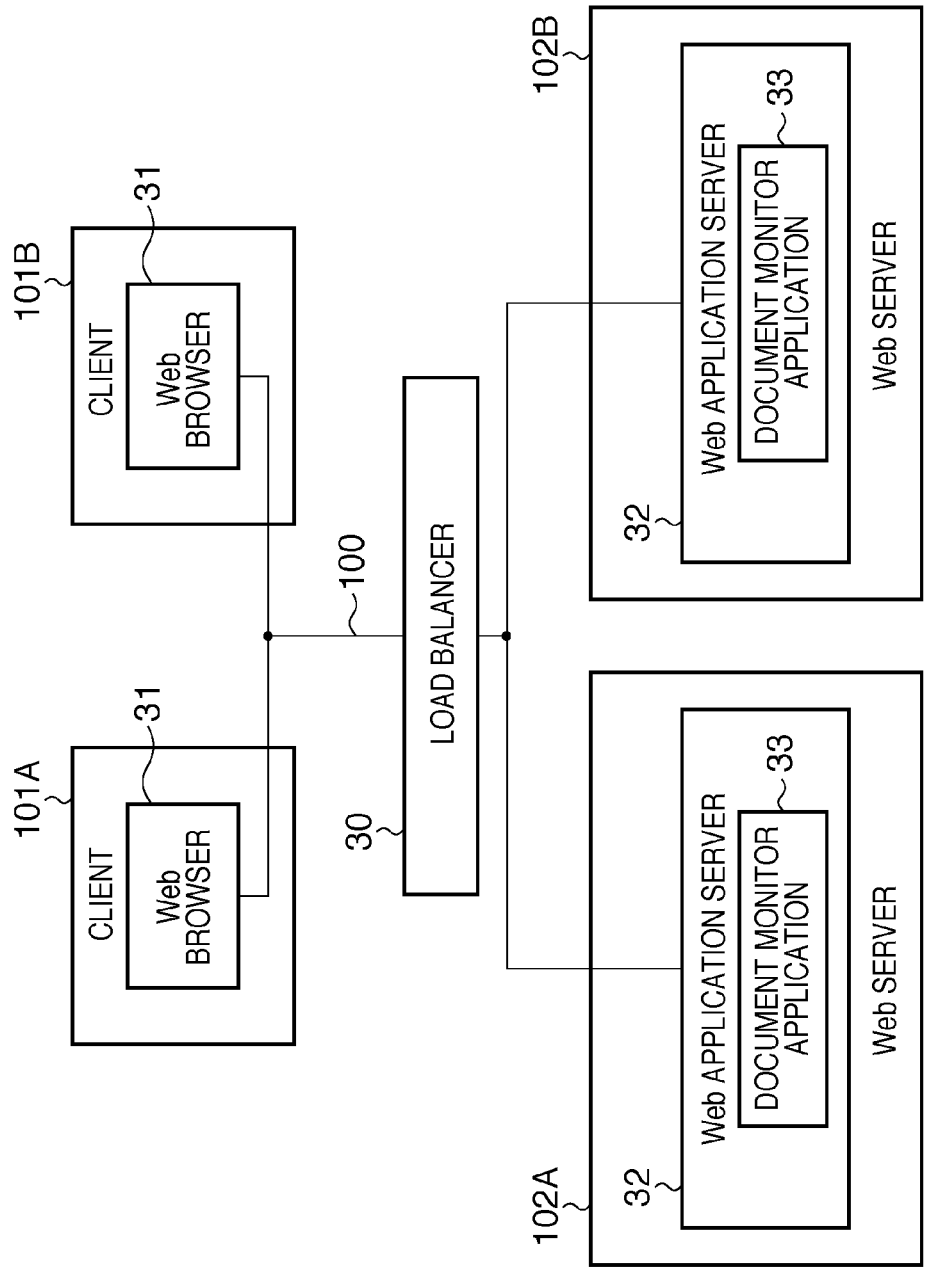

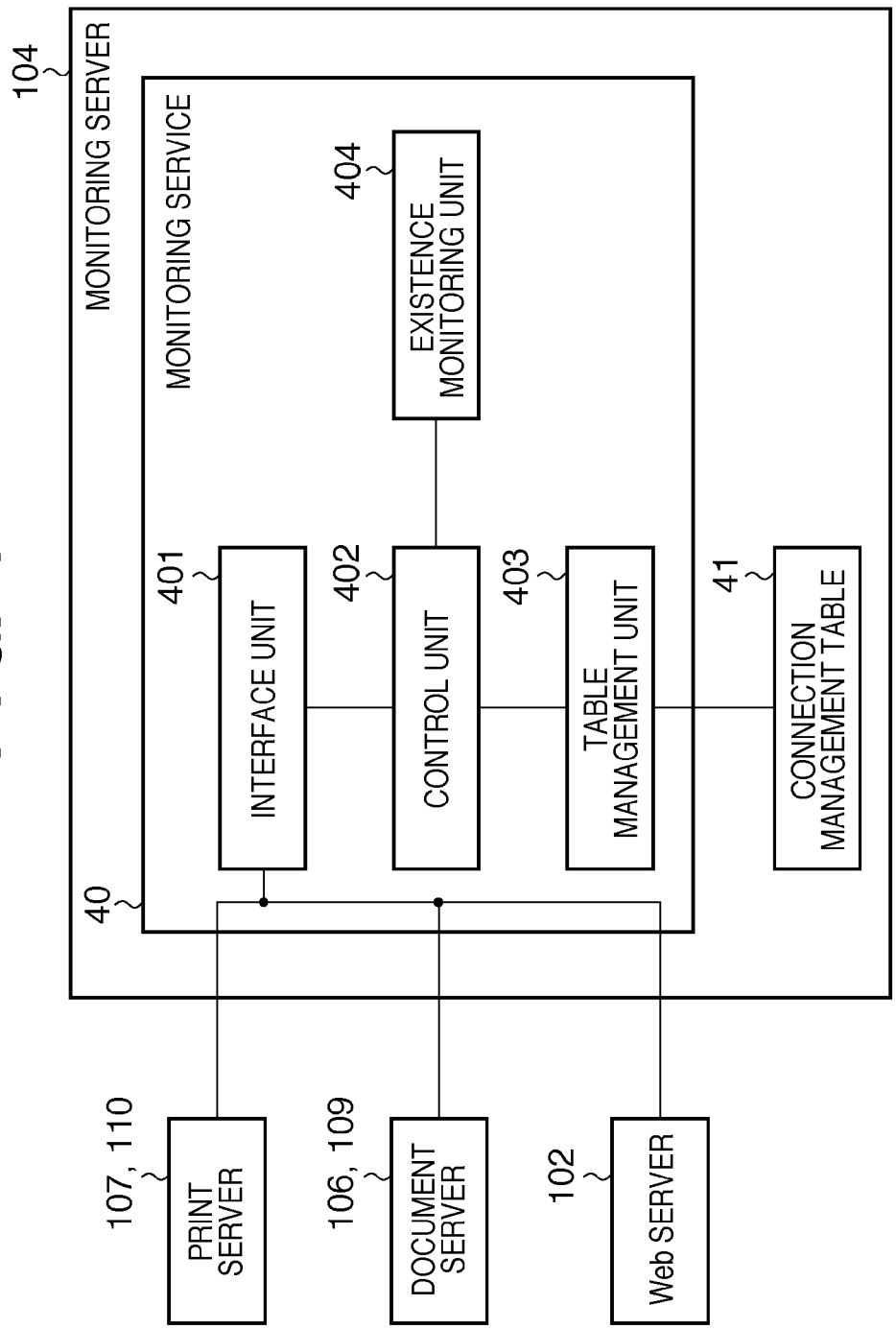

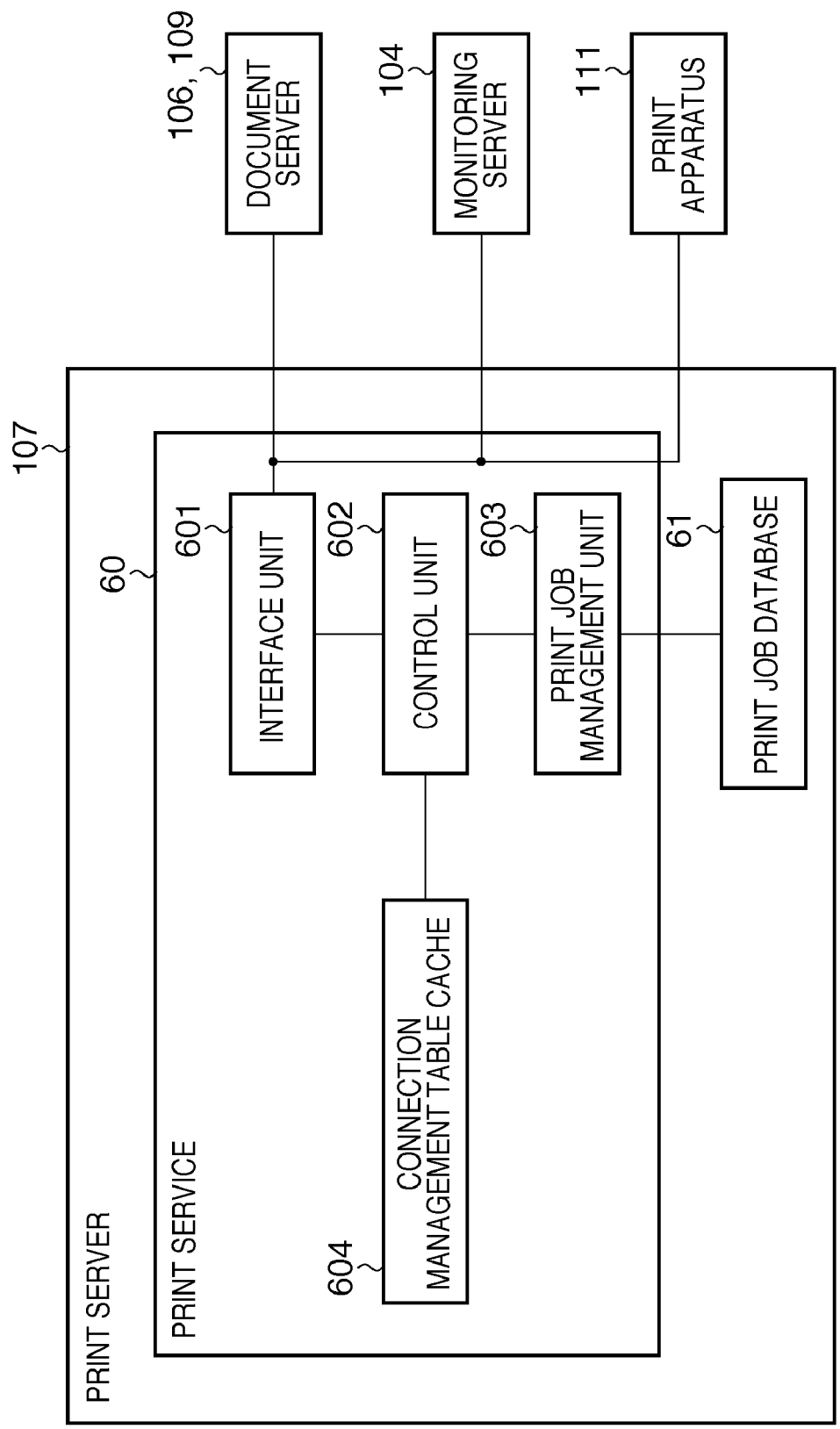

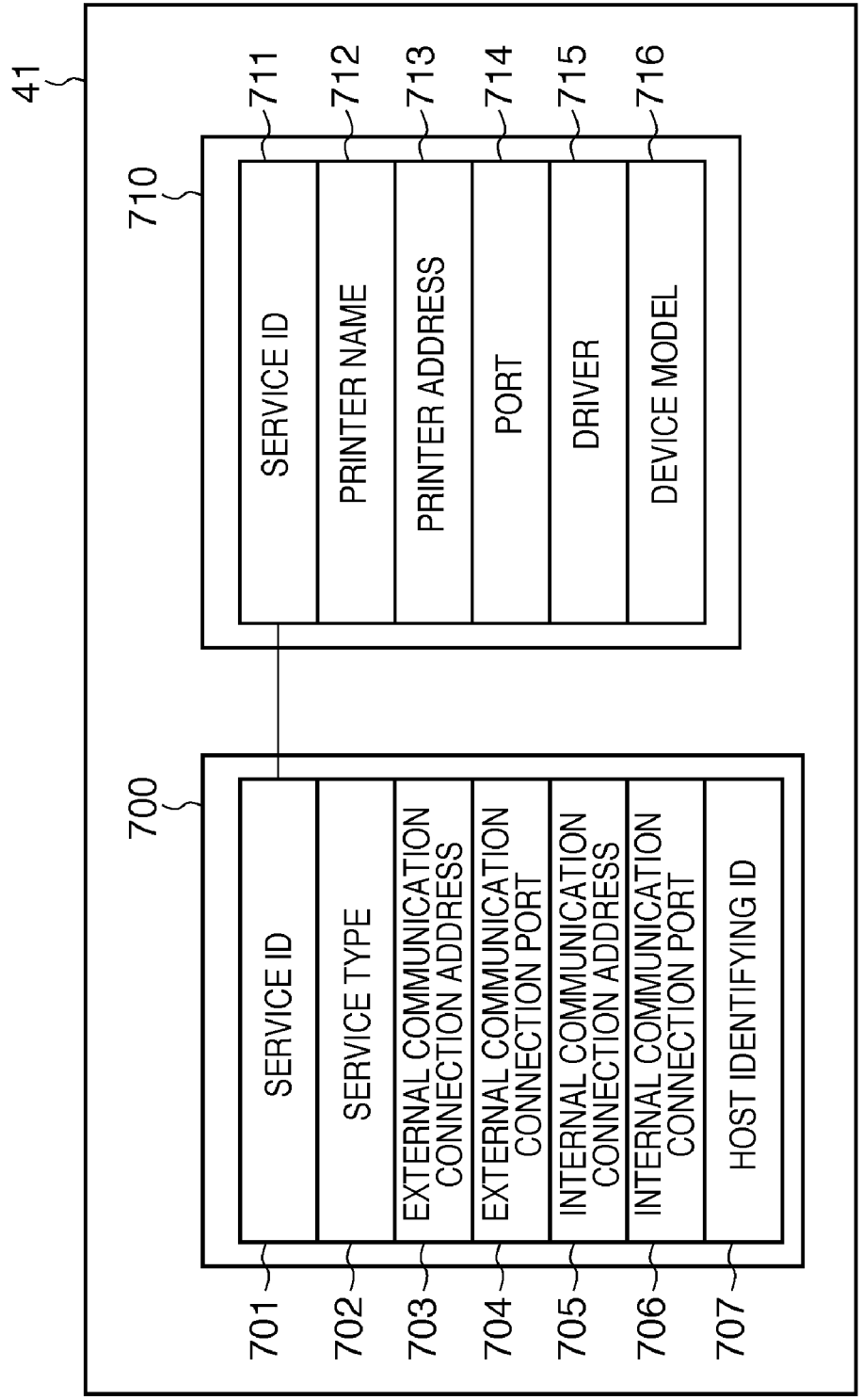

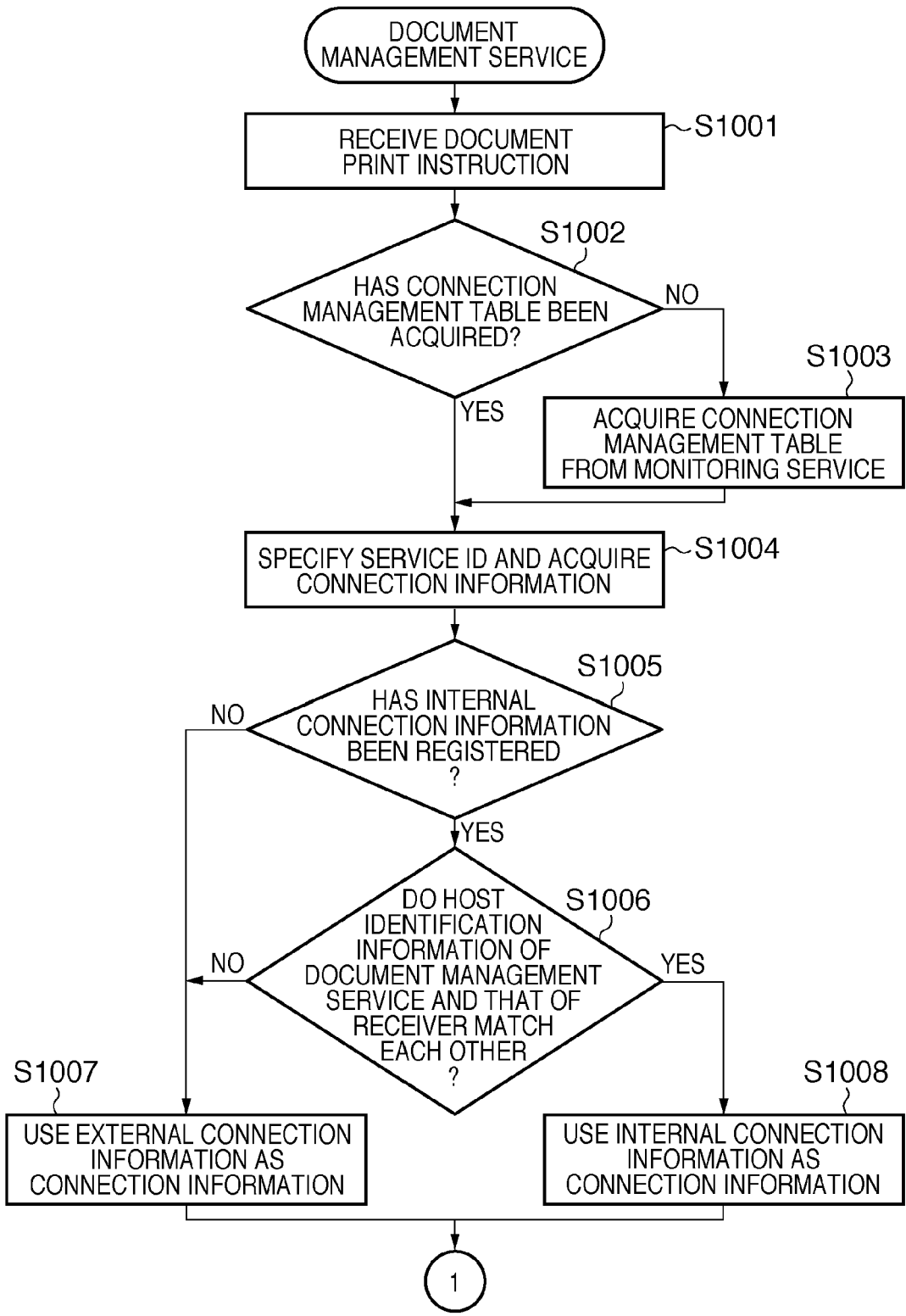

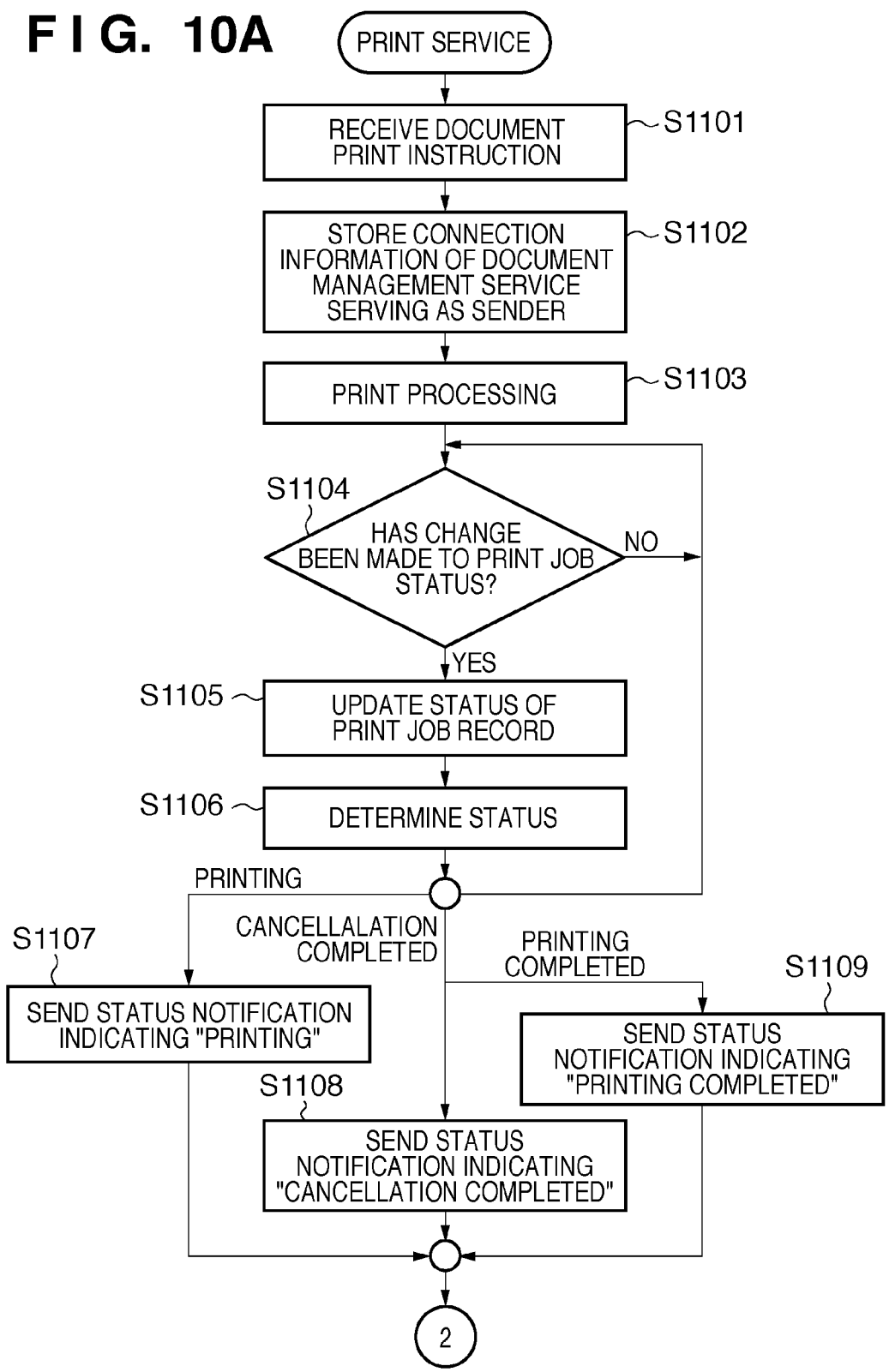

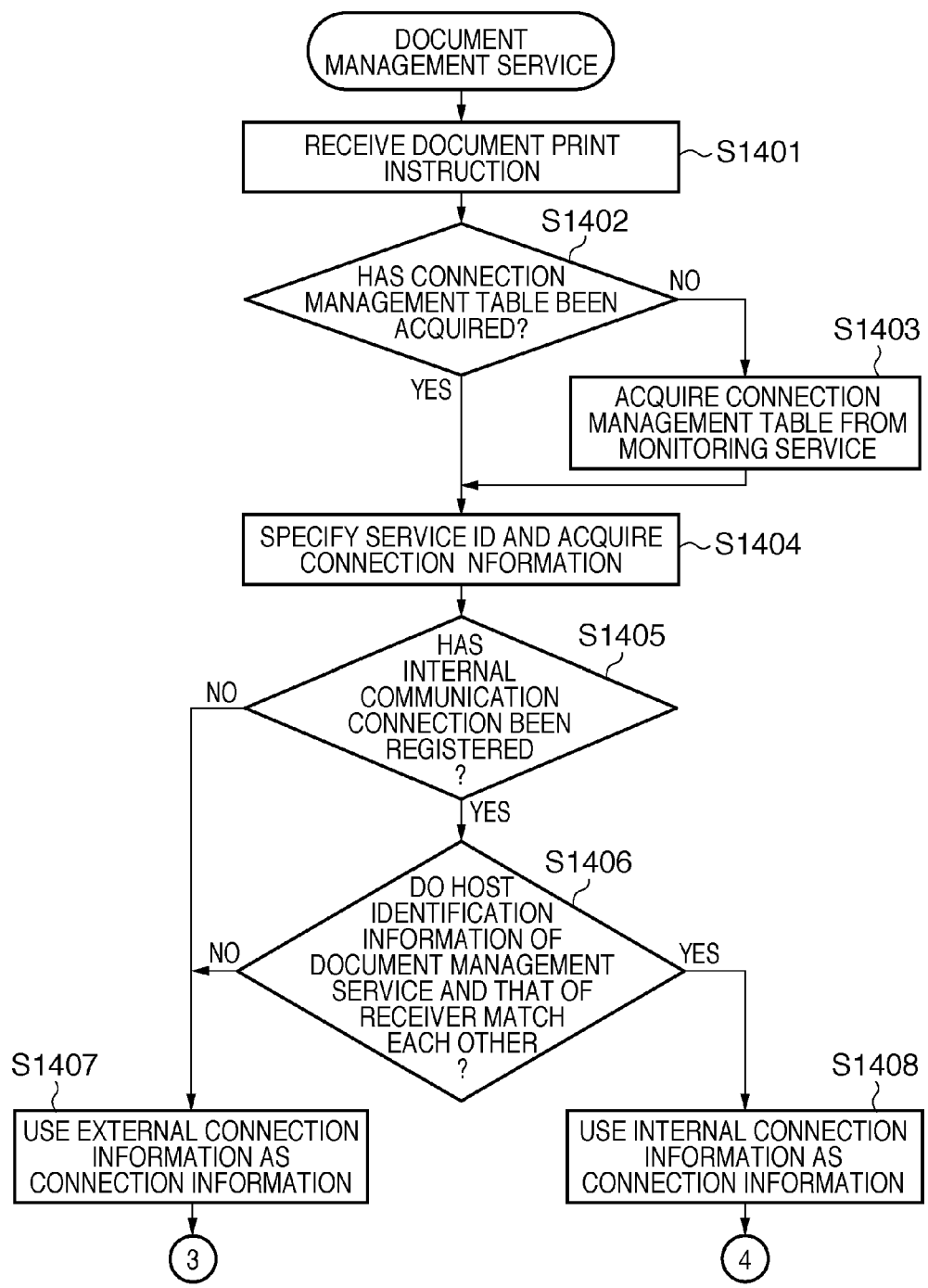

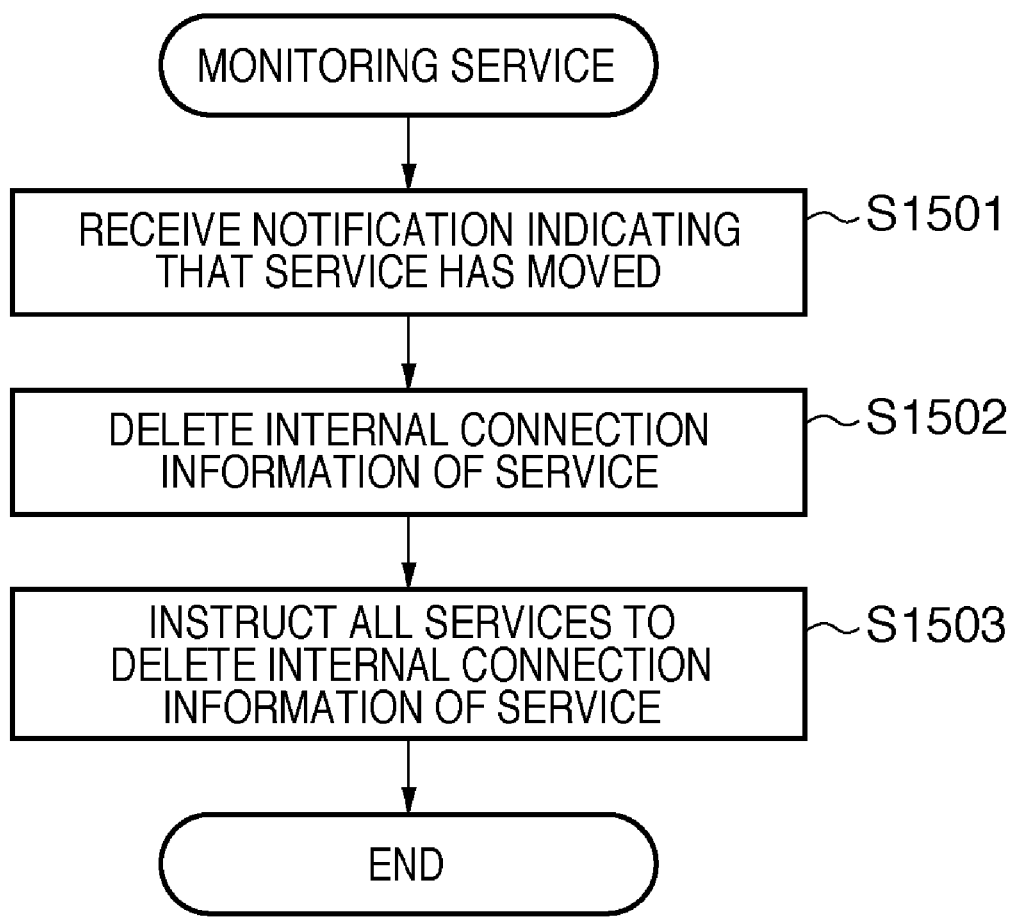

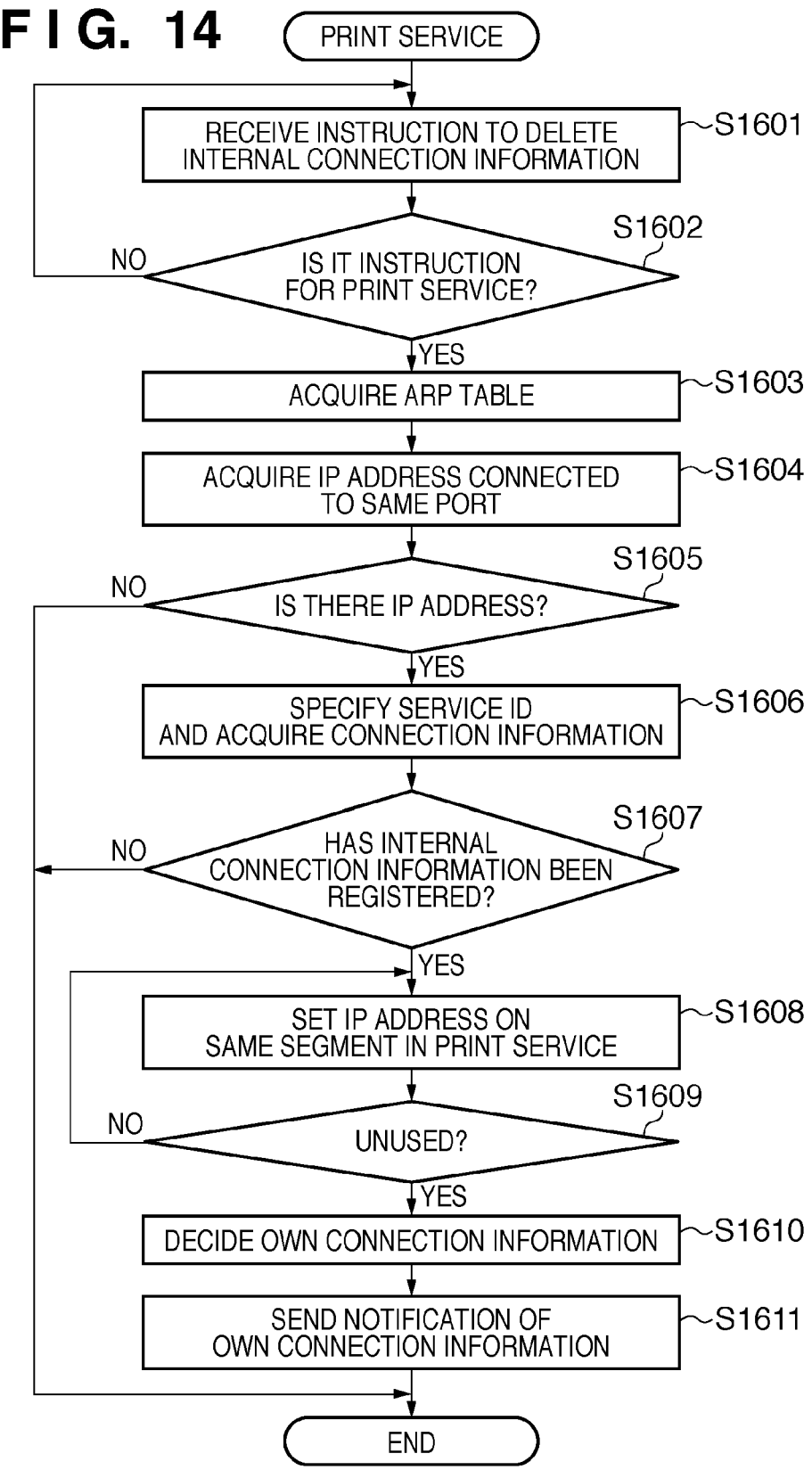

SYSTEM, METHOD, AND COMPUTER-READABLE MEDIUM FOR MANAGING COMMUNICATIONS AMONG SERVICE MODULES

TECHNICAL FIELD

The present invention relates to a communication method between information processing apparatuses in a system in which a plurality of network-connected information processing apparatuses operate in collaboration with each other, and particularly to a communication method between service modules in a virtualization environment.

BACKGROUND ART

With developments in server virtualization technology, server system infrastructures constructed using virtualization technology are increasing. The server virtualization is a technology for causing a single physical server (physical host) to operate as a plurality of independent servers, and is capable of causing a plurality of independent logical operating systems (OS) to run on a single physical host. Such logical operating systems are referred to as virtual machines (or guest OS). Typical examples of the virtualization technology include Microsoft's Hyper-V and Vmware's Vmware®. This virtualization technology is utilized in cloud computing.

There are roughly two types of network configuration for the virtualization environment. One is a network capable of communication between virtual machines operating on the same physical host, which is referred to as an internal network. The other is a network capable of communication between virtual machines operating on different physical hosts, which is referred to as an external network. Each virtual machine can be provided with one or more virtual network interface cards (NIC), in which the use of either the internal network or the external network is determined.

Conventional systems that operate in the virtualization environment employ the external network to perform communication between applications running on virtual machines. This is because a system can rarely be constructed in which applications, a database server, a print server and the like in the system all run on a single physical host.

In the external network, a virtual network is bound to a physical NIC provided in the physical host, and all network traffic is routed through the physical NIC. Accordingly, communication between virtual machines that use the external network is performed via the physical NIC. In the case of using the external network, for example, in a high-volume printing system used to implement the core business of an enterprise, a large amount of data needs to be exchanged between applications, which consumes resources of the physical NIC. This tendency appears more significantly as the number of virtual machines operating on the same physical host increases because the physical NIC is shared by a plurality of virtual machines. Consequently, communication delays occur in the high-volume print processing.

As a specific example of a communication delay, a case has been reported in which the time required to transfer a large amount of files between virtual machines operating on the same physical host was approximately one hour using the internal network, but 8 hours using the external network. Aside from communication delays, there is a possibility that, in some cases, errors might occur in parts of the processing due to communication timeout.

As a conventional technique regarding a communication path between apparatuses, for example, Japanese Patent Laid-Open No. 2000-209278 discloses a method in which communication is performed between two communication apparatuses by using a plurality of communication paths. As a conventional technique for selectively using communication paths, for example, a technique has been proposed in which two physical NICs are mounted on a server (physical host), one of the NICs is used for communication with a client, and data shared between servers is placed in storage connected to the other NIC (Oracle Real Application Clusters, [online], Oracle Corporation, April, 2007, Internet, <URL: http://www.oracle.com/lamg/jp/database/rac_home.html, for example).

However, the conventional techniques have been designed to operate in an environment in which the virtualization technology is not used, and thus have a problem in that selective use of the external network and the internal network is not possible in the virtualization environment. Japanese Patent Laid-Open No. 2000-209278 enables a connection to a wide area network (WAN) from a terminal in a local area network (LAN), and can be applied only to the external network in the virtualization environment. With Oracle Real Application Clusters, [online], Oracle Corporation, April, 2007, Internet, <URL: http://www.oracle.com/lamg/jp/database/rac_home.html>, the internal network can be used only when the server and database server that share data operate on the same physical host, but otherwise, the external network is used.

In a system in which a large amount of data needs to be exchanged between applications by using the external network, resources of the physical NIC are consumed, causing communication delays, and in some cases communication errors. Because a plurality of virtual machines share the physical NIC, the possibility of the occurrence of communication delays and communication errors increases as the number of virtual machines operating on the same physical host increases.

For this reason, selective use of communication paths is necessary such as using the internal network to perform communication between virtual machines on the same physical host and using the external network to perform communication between virtual machines operating on different physical hosts.

SUMMARY OF INVENTION

According to one aspect of the present invention, there is provided a communication method between service modules in a system in which service modules operating on a plurality of information processing apparatuses connected with a network operate in collaboration with each other, the system including a monitoring apparatus that is provided with a monitor module monitoring a connection between service modules in the system and that has connection management information including identifier information for uniquely identifying an information processing apparatus in which a service module is operating in the system, and connection information including external connection information for the service module to perform communication using an external network between the information processing apparatuses and internal connection information for the service module to perform communication using an internal network of the information processing apparatus, the method comprising the steps of: acquiring, with connection management information acquiring means of the information processing apparatus, the connection management information from the monitor module; acquiring, with connection information acquiring means of the information processing apparatus, connection information of a communication destination service module from the acquired connection management information; comparing, with comparing means of the information processing apparatus, the identifier information of the information processing apparatus in which the service module is operating and identifier information of an information processing apparatus in which the communication destination service module is operating; and deciding, with deciding means of the information processing apparatus, which of the internal connection information and the external connection information included in the connection management information to use based on a result obtained in the comparing step, wherein the deciding step decides to use the internal connection information to perform communication with the communication destination service module using the internal network if it is determined in the comparing step that the identifier information items match each other, and decides to use the external connection information to perform communication with the communication destination service module using the external network if it is determined in the comparing step that the identifier information items do not match each other.

According to another aspect of the present invention, there is provided a communication method between service modules in a system in which service modules operating on a plurality of information processing apparatuses connected with a network operate in collaboration with each other, the system including a monitoring apparatus that is provided with a monitor module monitoring a connection between service modules in the system and that has connection management information including identifier information for uniquely identifying an information processing apparatus in which a service module is operating in the system and connection information including external connection information for the service module to perform communication using an external network between the information processing apparatuses and internal connection information for the service module to perform communication using an internal network of the information processing apparatus, the method comprising the steps of: acquiring, with connection management information acquiring means of the information processing apparatus, the connection management information from the monitor module; acquiring, with connection information acquiring means of the information processing apparatus, connection information of a communication destination service module from the acquired connection management information; comparing, with comparing means of the information processing apparatus, the identifier information of the information processing apparatus in which the service module is operating and identifier information of an information processing apparatus in which the communication destination service module is operating; deciding, with deciding means of the information processing apparatus, which of the internal connection information and the external connection information included in the connection management information to use based on a result obtained in the comparing step, determining, with determining means of the information processing apparatus, whether or not a connection to the communication destination service module in the network has been established successfully using the connection information; and notifying, with notifying means of the information processing apparatus, the monitor module of a result of the connection to the communication destination service module, wherein the deciding step makes a change to use the external connection information if the deciding step has decided to use the internal connection information and the determining step has determined that the connection has failed, and the notifying step notifies the monitor module that the communication destination service module has moved from a host in which the communication destination service module is operating if a connection has been established successfully using the external connection information.

According to another aspect of the present invention, there is provided a system including a plurality of information processing apparatuses in which service modules that operate in collaboration with a monitoring apparatus provided with a monitor module operate, wherein the monitoring apparatus has connection management information including identifier information for uniquely identifying an information processing apparatus in which a service module is operating in the system and connection information including external connection information for the service module to perform communication using an external network between the information processing apparatuses and internal connection information for the service module to perform communication using an internal network of the information processing apparatus, the information processing apparatus comprises: connection management information acquiring means for acquiring the connection management information from the monitor module; connection information acquiring means for acquiring connection information of a communication destination service module from the acquired connection management information; comparing means for comparing the identifier information of the information processing apparatus in which the service module is operating and identifier information of an information processing apparatus in which the communication destination service module is operating; and deciding means for deciding which of the internal connection information and the external connection information included in the connection management information to use based on a result obtained from the comparing means, and the deciding means decides to use the internal connection information to perform communication with the communication destination service module using the internal network if the comparing means has determined that the identifier information items match each other, and decides to use the external connection information to perform communication with the communication destination service module using the external network if the comparing means has determined that the identifier information items do not match each other.

According to another aspect of the present invention, there is provided a program that causes a computer to function as: connection management information acquiring means for acquiring connection management information from a monitor module; connection information acquiring means for acquiring connection information of a communication destination service module from the acquired connection management information; comparing means for comparing identifier information of an information processing apparatus in which a service module is operating and identifier information of an information processing apparatus in which the communication destination service module is operating; and deciding means for deciding which of internal connection information and external connection information included in the connection management information to use based on a result obtained from the comparing means, wherein the deciding means decides to use the internal connection information to perform communication with the communication destination service module using an internal network if the comparing means has determined that the identifier information items match each other, and decides to use the external connection information to perform communication with the communication destination service module using an external network if the comparing means has determined that the identifier information items do not match each other.

According to the present invention, it is possible to achieve selective use of an external network and an internal network in a virtualization environment. Furthermore, even in a system in which a large amount of data needs to be exchanged between applications such as a high-volume printing system, it is possible to suppress communication delays and communication errors. It is also possible to improve the processing speed as compared to the case of using only the external network.

Further features of the present invention will become apparent from the following description of exemplary embodiments with reference to the attached drawings.

BRIEF DESCRIPTION OF DRAWINGS

FIG. 1 is a diagram showing a network configuration according to an embodiment of the present invention.

FIG. 3 is a diagram showing a module configuration of web browsers and web servers according to the embodiment of the present invention.

FIG. 4 is a diagram showing a configuration of a monitoring service module according to the embodiment of the present invention.

FIG. 6 is a diagram showing a configuration of a print service module according to the embodiment of the present invention.

FIG. 7 shows an example of a configuration of a connection management table according to the embodiment of the present invention.

FIGS. 9A and 9B are flowcharts illustrating document management service processing according to a first embodiment.

FIGS. 10A and 10B are flowcharts illustrating print service processing according to the first embodiment.

FIGS. 12A and 12B are flowcharts illustrating document management service processing according to the second embodiment.

FIG. 13 is a flowchart illustrating monitoring service processing according to the second embodiment.

FIG. 14 is a flowchart illustrating print service processing according to the second embodiment.

DESCRIPTION OF EMBODIMENTS

First Embodiment

Figure 2A:
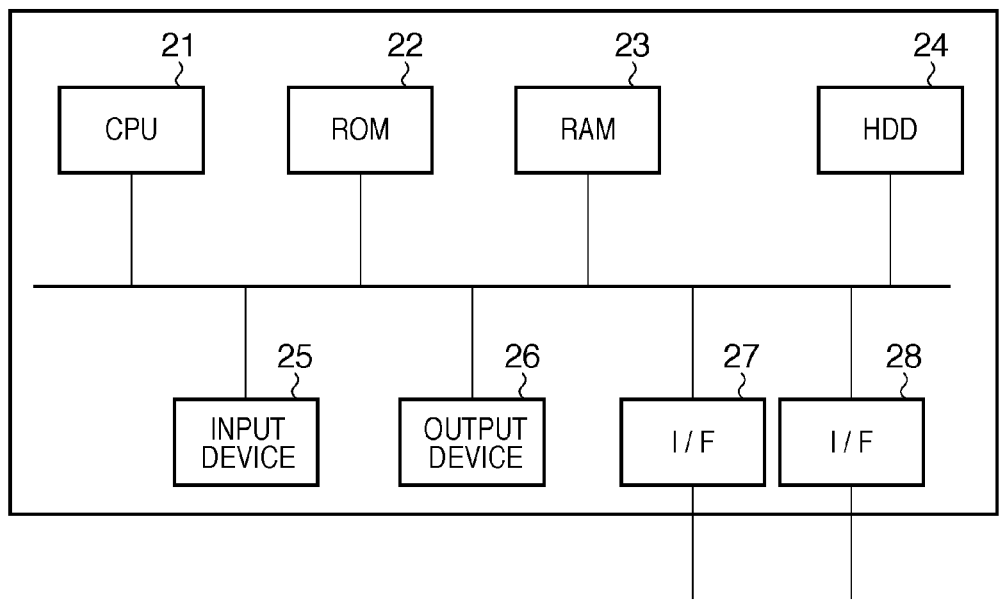
FIGS. 2A and 2B are diagrams showing hardware configurations according to the embodiment of the present invention.

Hereinafter, embodiments for carrying out the present invention will be described with reference to the accompanying drawings. FIG. 1 is a block diagram showing a system configuration according to the present embodiment. In FIG. 1, a network 100 connects constituent elements. In other words, the constituent elements are network-connected by the network 100. A client 101 issues requests to a web server 102. The web server 102 receives requests from the client 101. A monitoring server 104 monitors the states of document servers 106 and 109 and the states of print servers 107 and 110. The document servers 106 and 109 process requests received by the web server 102. The print servers 107 and 110 receive documents from the document servers 106 and 109 and perform print processing.

A print apparatus 111 receives print jobs from the print servers 107 and 110 and makes printouts. Host computers 103, 105 and 108 indicate physical host computers. In a single physical host computer 105, two logical operating systems (virtual machines) have been created using a virtualization technique, and the document server 106 and the print server 107 are operating on the respective logical operating systems. The above-described constituent elements are connected by the network 100 so as to be capable of communication with each other. Communication is performed using, as communication means, communication protocols such as HTTP and SOAP over HTTP, in other words, web services, as well as TCP/IP intercommunication. In the present invention, the physical host computers are hereinafter referred to as physical hosts. Likewise, the logical operating systems created on each physical host are referred to as "virtual machines". In the present embodiment, service modules (or software modules) are referred to simply as services. The present embodiment is applicable to cloud computing.

System Configuration

FIG. 2A is a block diagram showing a hardware configuration of the client 101, the web server 102, the monitoring server 104, the document servers 106 and 109, and the print servers 107 and 110 shown in FIG. 1. A CPU 21 directly or indirectly controls devices (ROM 22, RAM 23 and the like described later) connected via an internal bus, and executes a program for implementing the present invention. The ROM 22 stores a BIOS and the like. The RAM (direct storage device) 23 is utilized as a work area by the CPU 21 or as a temporary storage for loading software modules for implementing the present invention. A hard disk drive (HDD) 24 is an indirect storage device, such as a HDD or an SSD (solid state drive), in which basic software (OS) and software modules are stored. An input device 25 is a keyboard, a pointing device or the like. An output device 26 is a display or the like. Interfaces (I/F) 27 and 28 are network interface cards (NIC) or the like, and connection to the network 100 is made via the I/Fs.

With the hardware configuration, upon activation, the CPU 21 reads the BIOS stored in the ROM 22 and then executes the BIOS, thereby the OS is loaded from the HDD 24 into the RAM 23 so as to be capable of execution. The CPU 21 loads various software modules, which will be described later, from the HDD 24 into the RAM 23 as necessary according to the operation of the OS, so as to be capable of execution. The software modules are executed and operated by the CPU 21 in collaboration with the above-described devices. The I/Fs 27 and 28 are connected to the network 100, and controlled by the CPU 21 according to the operation of the OS, thereby implementing communication with the above-described communication means. The functions of the above-described apparatuses (servers) are not limited to the functions given herein as long as the apparatuses can implement functions provided in ordinary information processing apparatuses.

Figure 2B:
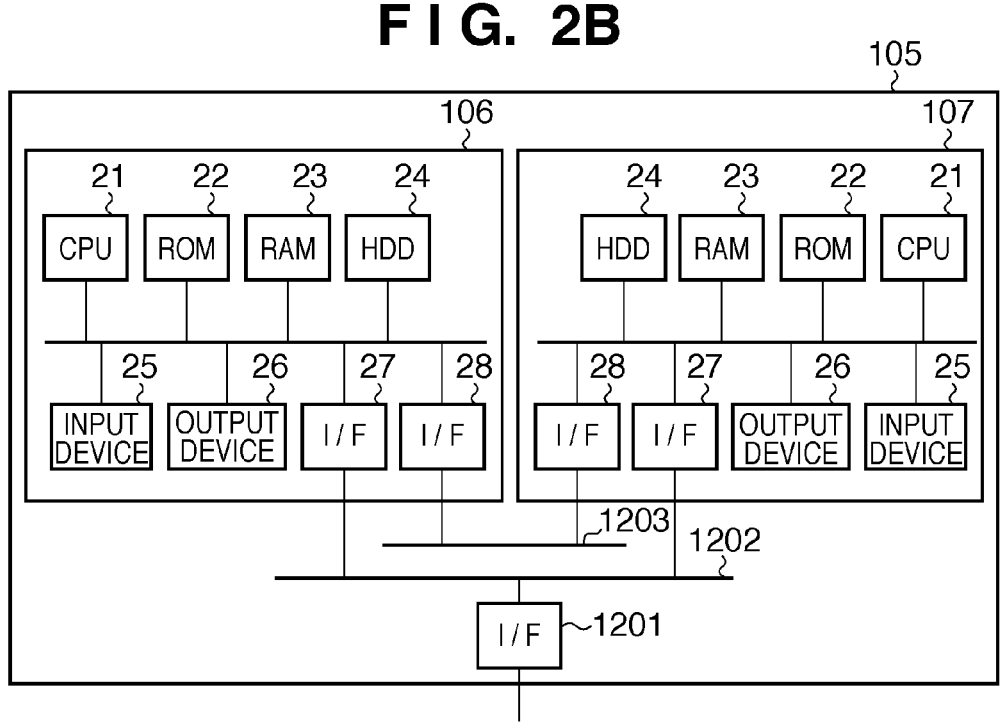

FIG. 2B is a block diagram showing a hardware configuration of the physical host 105, as well as hardware configurations of the document server 106 and the print server 107 that operate on virtual machines created on the physical host 105. This applies to a hardware configuration of the physical host 108 and those of the document server 109 and the print server 110 that operate on virtual machines created on the physical host 108. The hardware configurations of the document server 106 and the print server 107 are virtual hardware configurations created by virtualization technology. The I/Fs 27 and 28 in FIG. 2B indicate virtual network interface cards (NIC) created by virtualization technology. Hereinafter, such NICs are referred to as "virtual NICs". The constituent elements are the same as those of FIG. 2A except for being virtual, and thus redundant descriptions are omitted here. In FIG. 2B, an I/F 1201 is a physical network interface card (NIC) mounted on the physical host, and is connected to the network 100. Hereinafter, such a physical NIC mounted on a physical host will be referred to as a "physical NIC".

In FIG. 2B, a network 1202 is a virtual network capable of communication with a virtual machine operating on another physical host. Hereinafter, the virtual network (inter-physical host network) capable of communication with a virtual machine running on another physical host will be referred to as an "external network". The external network 1202 is connected to the physical NIC 1201, and performs data exchange between virtual machines from the virtual NIC 27 via the physical NIC 1201. A network 1203 is a virtual network capable of communication between virtual machines operating on the same physical host. Hereinafter, the virtual network (intra-physical host network) capable of communication only between virtual machines running on the same physical host will be referred to as an "internal network". The internal network 1203 is not connected to the physical NIC 1201, and enables direct communication between the virtual NICs 28 without via the physical NIC 1201, as well as data exchange between the virtual machines.

In the present embodiment, the services provided within the system include a print service and a document management service, but the present embodiment is not limited thereto, and other services may be added as necessary. Here, the present invention is applicable as long as an environment in which various services are operated on a virtual network can be implemented.

Module Configuration

FIG. 3 is a configuration diagram of software modules that run on clients 101 and web servers 102. Each software module is stored in a corresponding HDD 24 shown in FIG. 2A, and loaded into a corresponding RAM 23 and executed by a corresponding CPU 21 as described earlier. The clients 101 are provided with a web browser 31 as a user interface application. The web servers 102 include a web application server 32, and a document monitor application 33 is deployed in each web application server 32.

The document monitor application 33 is configured as a so-called web application on the web application server 32, and the client 101 can access the document monitor application 33 via the web browser 31. The document monitor application 33 returns user interface information in response to a request from the web browser 31. The web browser 31 renders and displays the user interface information obtained from the document monitor application 33. The displayed user interface information includes, for example, a document information list managed by a document management service, an interface for making a request to print a document, and so on. The document monitor application 33 makes, to the document management service, a request to acquire a document information list or print a document requested by the web browser 31.

FIG. 4 is a configuration diagram of a monitoring service module (monitor module) that runs on the monitoring server 104. Each software module is stored in the HDD 24 shown in FIG. 2A, and loaded into the RAM 23 and executed by the CPU 21 as described earlier. A monitoring service 40 monitors the status of a document management service 50 and a print service 60, and executes processing such as failover depending on the status of each service. The monitoring service 40 receives requests from the document monitor application 33, the document management service 50 and the print service 60, and returns connection information, which will be described later. The monitoring service 40 is constituted by an interface unit 401, a control unit 402, a table management unit 403 and an existence monitoring unit 404. The interface unit 401 processes communication with other services. The control unit 402 executes processing according to received requests. The table management unit 403 executes processing on a connection management table 41. The existence monitoring unit 404 is a trigger for regularly monitoring the existence state of each service. The monitoring service 40 executes processing, which will be described later, in collaboration with the constituent elements.

The interface unit 401 performs communication with the document monitor application 33, the document management service 50 and the print service 60. The communication is executed by the CPU 21 shown in FIG. 2A via the I/Fs 27 and 28 according to the operation of the OS in response to the OS receiving an instruction from each software module. The connection management table 41 contains connection information for performing communication with the document management service 50 and the print service 60. Connection information for each service is notified to the monitoring service 40 during kitting process in which each service is incorporated into the system, and the monitoring service 40 creates the connection management table 41 based on the notified connection information and stores the table on the HDD 24.

Figure 5:
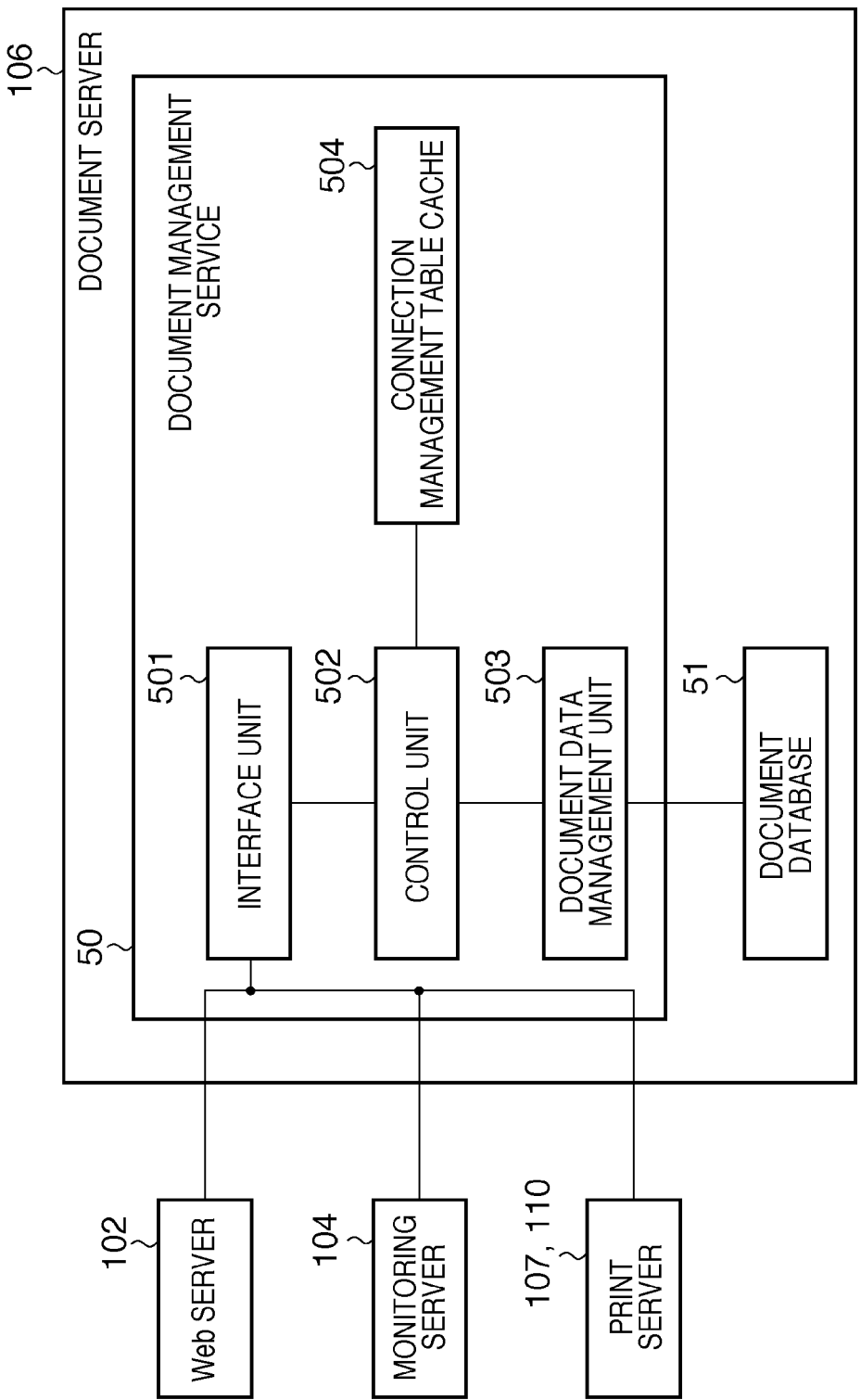
FIG. 5 is a diagram showing a configuration of a document management service module according to the embodiment of the present invention.

FIG. 5 is a configuration diagram of software modules that run on the document servers 106 and 109. Each software module is stored on the HDD 24 shown in FIG. 2A, and loaded into the RAM 23 and executed by the CPU 21 as described earlier. The document management service 50 receives requests from the document monitor application 33, and executes various types of document processing. The document management service 50 is constituted by an interface unit 501 that processes communication with other services, a control unit 502 that executes processing according to received requests, and a document data management unit 503 that executes processing on document data. A connection management table cache 504 caches the connection management table 41 acquired from the monitoring server 104. The connection management table cache 504 is stored in the RAM 23 shown in FIG. 2A. The interface unit 501 performs communication with the document monitor application 33, the monitoring server 104 and the print servers 107 and 110. The communication is executed by the CPU 21 shown in FIG. 2A via the I/Fs 27 and 28 according to the operation of the OS in response to the OS receiving an instruction from each software module.

A document management database 51 contains document data information. The document management database 51 is stored on the HDD 24 shown in FIG. 2A. The control unit 502 controls processing of each constituent unit of the document management service 50. When the interface unit 501 receives a request to print a document from the document monitor application 33, the control unit 502 acquires the corresponding document record from the document data management unit 503. The control unit 502 also transmits the document data to the print server 107 or 110 via the interface unit 501.

FIG. 6 is a configuration diagram of software modules that run on the print servers 107 and 110. Each software module is stored on the HDD 24 shown in FIG. 2A, and loaded into the RAM 23 and executed by the CPU 21 as described earlier. The print service 60 is a print service that receives a document from the document management service 50 and causes the print apparatus 111 to perform print processing. The print service 60 includes an interface unit 601 that processes communication with the document management service 50 and the monitoring service 40. The communication is executed by the CPU 21 shown in FIG. 2A via the I/Fs 27 and 28 according to the operation of the OS in response to the OS receiving an instruction from the interface unit 601. The print service 60 is constituted by a control unit 602 that processes received requests, and a print job management unit 603 that manages the progress of print jobs. A connection management table cache 604 caches the connection management table 41 acquired from the monitoring server 104, and stores the table in the RAM 23 shown in FIG. 2A. A print job database 61 contains print job information, and is stored on the HDD 24 shown in FIG. 2A.

The control unit 602 controls processing of each constituent unit of the print service 60. The interface unit 601 receives documents from the document servers 106 and 109. The interface unit 601 also transmits print jobs to the print apparatus 111. The control unit 602 creates a print job upon receiving a document from the document server 106 or 109, and transmits the print job to the print apparatus 111 via the interface unit 601. The control unit 602 waits for a notification containing print job progress/result information from the print apparatus 111. When the control unit 602 receives a notification containing print job progress/result information from the print apparatus 111, the print job management unit 603 updates the corresponding job record in the print job table stored in the print job database 61. The print job management unit 603 also sends a notification indicating the status to the document server 106 or 109.

Connection Management Table

FIG. 7 is a diagram showing a data structure of the connection management table 41, i.e., connection management information. The connection management table 41 includes service information 700 and printer information 710. The service information 700 contains and manages information regarding the document management service 50 and the print service 60. The service information 700 includes a service ID 701, a service type 702, an external communication connection address 703, an external communication connection port 704, an internal communication connection address 705, an internal communication connection port 706, and a host identifying ID 707. The service ID 701 is a service identifier. The service type 702 indicates the type of the service. The external communication connection address 703 contains a connection address for external network communication. The external communication connection port 704 contains a connection port number for external network communication. The internal communication connection address 705 contains a connection address for internal network communication. The internal communication connection port 706 contains a connection port number for internal network communication. The host identifying ID 707 is an identifier for identifying a physical host in which the service is running. The service type 702 is a region in which either the document management service 50 or the print service 60 is specified. The host identifying ID 707 contains information that can uniquely identify, within the network 100, a physical host in which the service is running, such as a host name, a FQDN address and a MAC address.

The printer information 710 contains and manages information regarding a printer managed by the print service 60. The printer information 710 includes a service ID 711, a registered printer name 712, a printer address 713, a printer port 714 for connecting to the printer, driver information 715, and a device model 716. The service ID 711 is an identifier for identifying the print service 60 managing the printer. The printer address 713 indicates the location of the printer. The driver information 715 is information used to perform printing using the managed printer. The device model 716 is the model name of the managed printer. The service ID 711 is related to the service ID of the service information 700.

Data Configuration

Figure 8A:
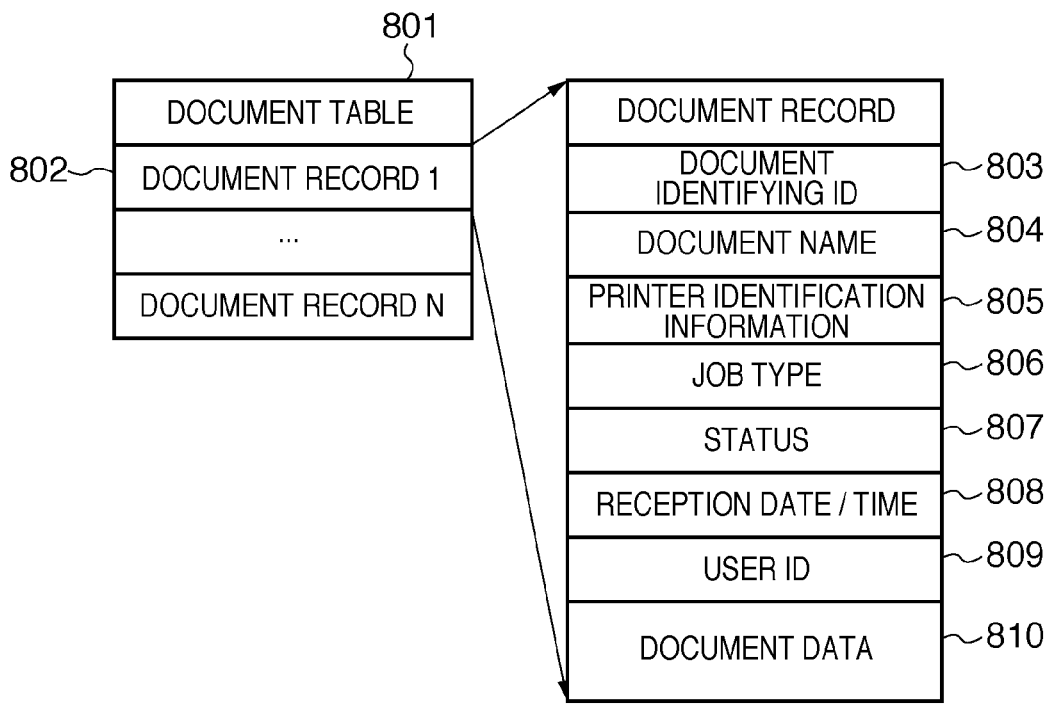
FIGS. 8A and 8B show examples of configurations of tables included in a database according to the embodiment of the present invention.

FIG. 8A shows an example of a configuration of a table in the document database 51 managed by the document management service 50. A document table 801 is a table that holds documents, and this table includes a plurality of document records 802. Document identifying ID 803 is an ID for uniquely identifying a document, and document name 804 is the name of the document. Printer identification information 805 is information for identifying the print apparatus 111 that performs print processing. As the identification information, an IP address, a host name and the like of the image forming apparatus are used. Job type 806 is the type of a description language of the saved job, such as PDL, PDF, and a document description language.

Status 807 indicates the status of the document, and holds status information indicating a state such as "waiting", "printing", "completed successfully" and "completed with an error". Reception date/time 808 is the date and time at which the document was input to the document management service 50 and the document management service 50 saved the document in the document database 51. User ID 809 is information for identifying an owner of the document. Document data 810 is the document itself that has been input to the document management service 50.

Figure 8B:
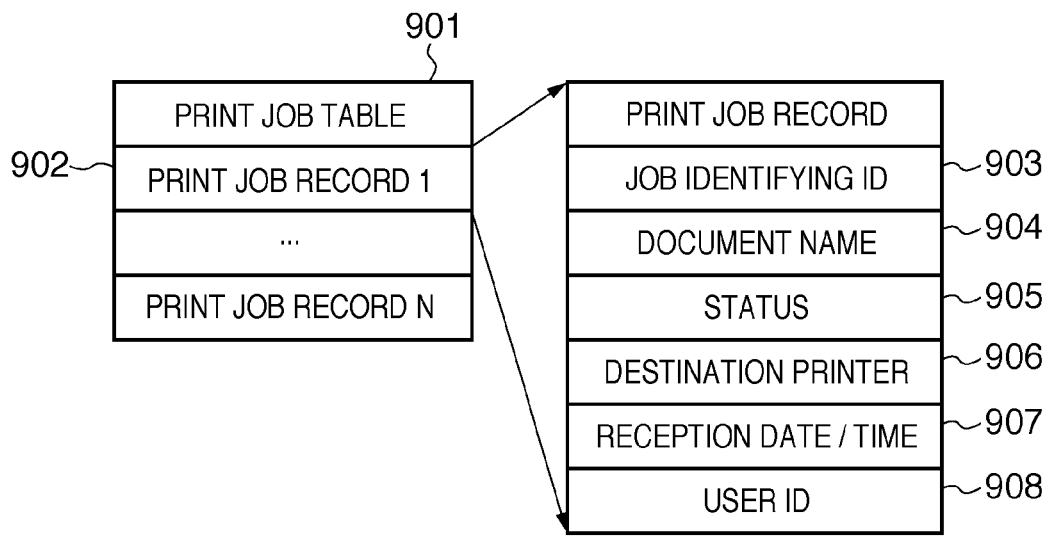

FIG. 8B shows an example of a configuration of a table in the print job database 61 managed by the print service 60. A print job table 901 is a table that holds print job information, and this table includes a plurality of print job records 902. Job identifying ID 903 is an ID for uniquely identifying a print job. Document name 904 indicating the name of the print job and status 905 holding the print state of the job are also included.

The status 905 holds information indicating "printing" when the print apparatus 111 starts printing, and indicates the result of printing, such as "completed", "interrupted" or the like, when printing is finished. Reception date/time 907 is the date and time at which the print service 60 received the print request. User ID 908 is identification information indicating a user who made the print request (a user name, a user ID, a password, and the like), session information generated by the web server 102, or the like.

Document Management Processing Procedure

Figure 9B:
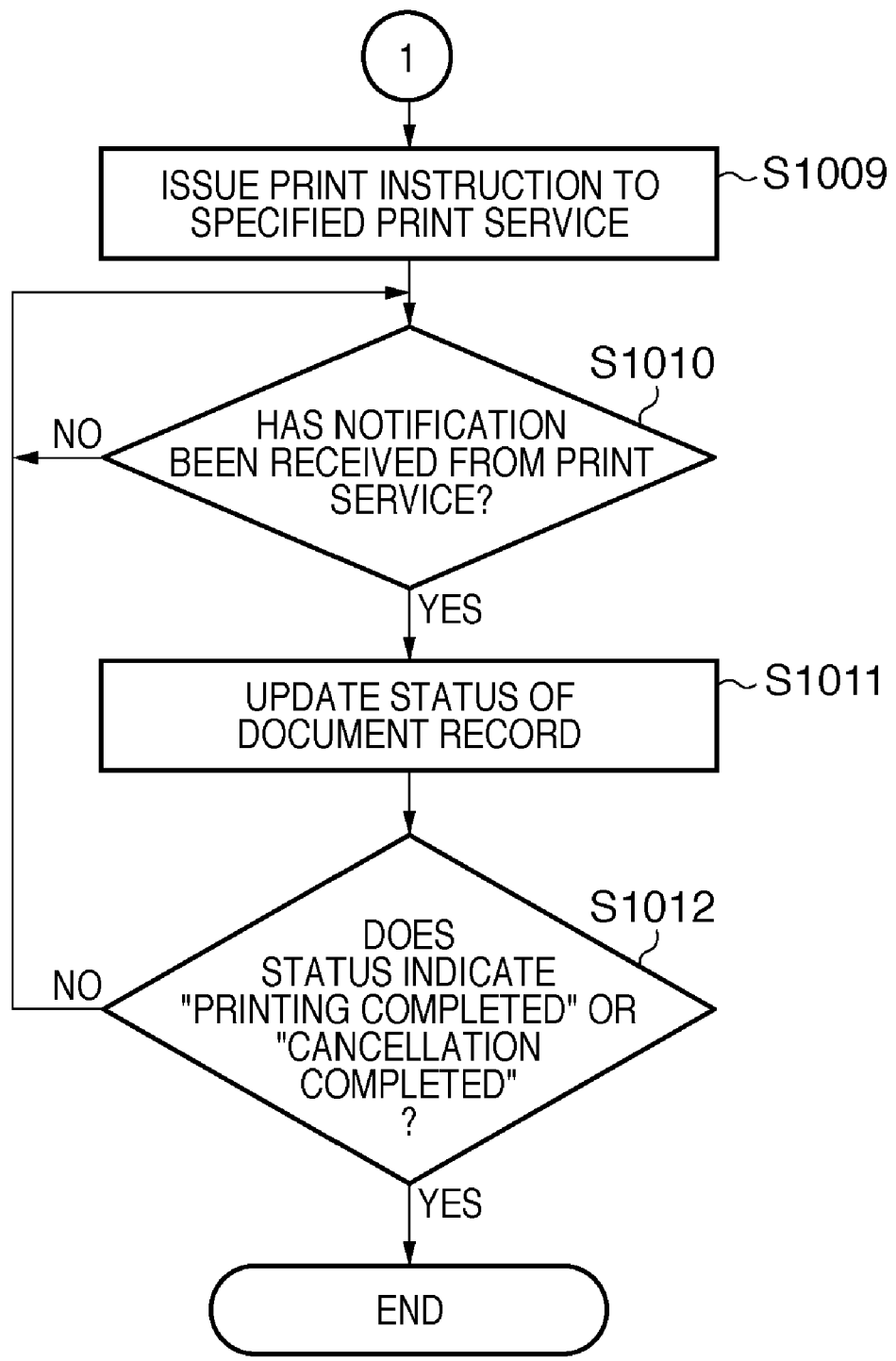

Hereinafter, a processing procedure performed by each software module of the present invention will be described with reference to a flowchart. FIGS. 9A and 9B are flowcharts illustrating processing performed when the document management service 50 has received a print request from the document monitor application 33 of the web server 102. In this specification, the control unit 502 is made up of a CPU, a RAM, a ROM, a HDD and the like, and the procedure shown in the flowchart is stored in any of the RAM, the ROM and the HDD of the control unit 502, and executed by the CPU 21. In the present invention, it is assumed that documents have already been saved in the document servers 106 and 109, and a request to print a specific document can be made from the document monitor application 33 of the web server 102.

Various methods are conceivable as a method for saving a document in the document servers 106 and 109, and the following method can be used, for example. If a request to save a document has been received from an application that created the document, the monitoring service 40 temporarily receives the request, and decides a save location based on the user name of a user who made the document save request. Then, the document is transmitted to either of the document servers 106 and 109 decided by the monitoring service 40. As a method for identifying a document from the document monitor application 33, a method is conceivable in which either of the document servers 106 and 109 to be accessed is decided based on the user name of a user who has logged in so as to acquire a document information list, and a document is identified. However, the present invention is not limited to this method.

In S1001, the control unit 502 receives a print request from the document monitor application 33. Next, in S1002, the control unit 502 determines whether the connection management table 41 has been acquired from the monitoring service 40. If the connection management table 41 has not been acquired, in S1003, the connection management table 41 is acquired from the monitoring service 40, and stored in the connection management table cache 504. Connection management information is thereby acquired.

Next, in S1004, the control unit 502 acquires, based on the name of a printer where printing is carried out specified as a communication destination service in the print request, a service ID of the print service 60 managing the printer from printer information 710 stored in the connection management table cache 504. From the service ID specified as a communication destination service and service information 700, the print service 60 managing the printer is specified. More specifically, the service ID 711 of the printer information 710 is specified from the printer name, and service information 700 related to the service ID is acquired. The acquired information includes an external communication connection address 703, an external communication connection port 704, an internal communication connection address 705, an internal communication connection port 706, and a host identifying ID 707. The control unit 502 acquires, from the service information 700 stored in the connection management table cache 504, an internal communication connection address 705, an internal communication connection port 706 and a host identifying ID 707 of the document management service 50. Connection information is thereby acquired. The information acquired here are collectively referred to as connection information.

Next, in S1005, the control unit 502 determines whether the internal communication connection address 705 of the document management service 50 and the internal communication connection address 705 of the print service 60 specified as a communication destination service have been registered. If both internal communication connection addresses 705 have been registered, in S1006, the control unit 502 compares the host identifying ID 707 of the document management service 50 and the host identifying ID 707 of the specified print service 60 (communication destination service module), and determines whether or not they match each other. If it is determined in S1005 that either or both of the internal communication connection addresses 705 have not been registered, control advances to S1007.

If it is determined in S1006 that the host identifying IDs 707 do not match each other, in S1007, the control unit 502 decides to use the external communication connection address 703 and the external communication connection port 704 of the document management service 50 serving as a sender. The control unit 502 also decides to use the external communication connection address 703 and the external communication connection port 704 of the print service 60 serving as a receiver. If it is determined in S1006 that the host identifying IDs 707 match each other, in S1008, the control unit 502 decides to use the internal communication connection address 705 and the internal communication connection port 706 of the document management service 50 serving as a sender. The control unit 502 also decides to use the internal communication connection address 705 and the internal communication connection port 706 of the print service 60 serving as a receiver.

After processing of S1007 or S1008, in S1009, the control unit 502 transmits a document to the print service 60. Subsequently, in S1010, the control unit 502 determines whether or not a notification has been received from the print service. If it is determined in S1010 that a status communication has been received from the print service 60, in S1011, the status of the corresponding document record in the document database 51 is updated. Then, in S1012, it is determined whether or not the notified status indicates either "printing completed" or "cancellation completed". If it is determined in S1012 that the notified status indicates either "printing completed" or "cancellation completed", the processing procedure is finished. If it is determined in S1012 that the notified status indicates neither "printing completed" or "cancellation completed", control returns to S1010, where the control unit 502 waits for receipt of a notification. The document management service 50 executes print processing through the above procedure.

Print Service Processing

Figure 10B:
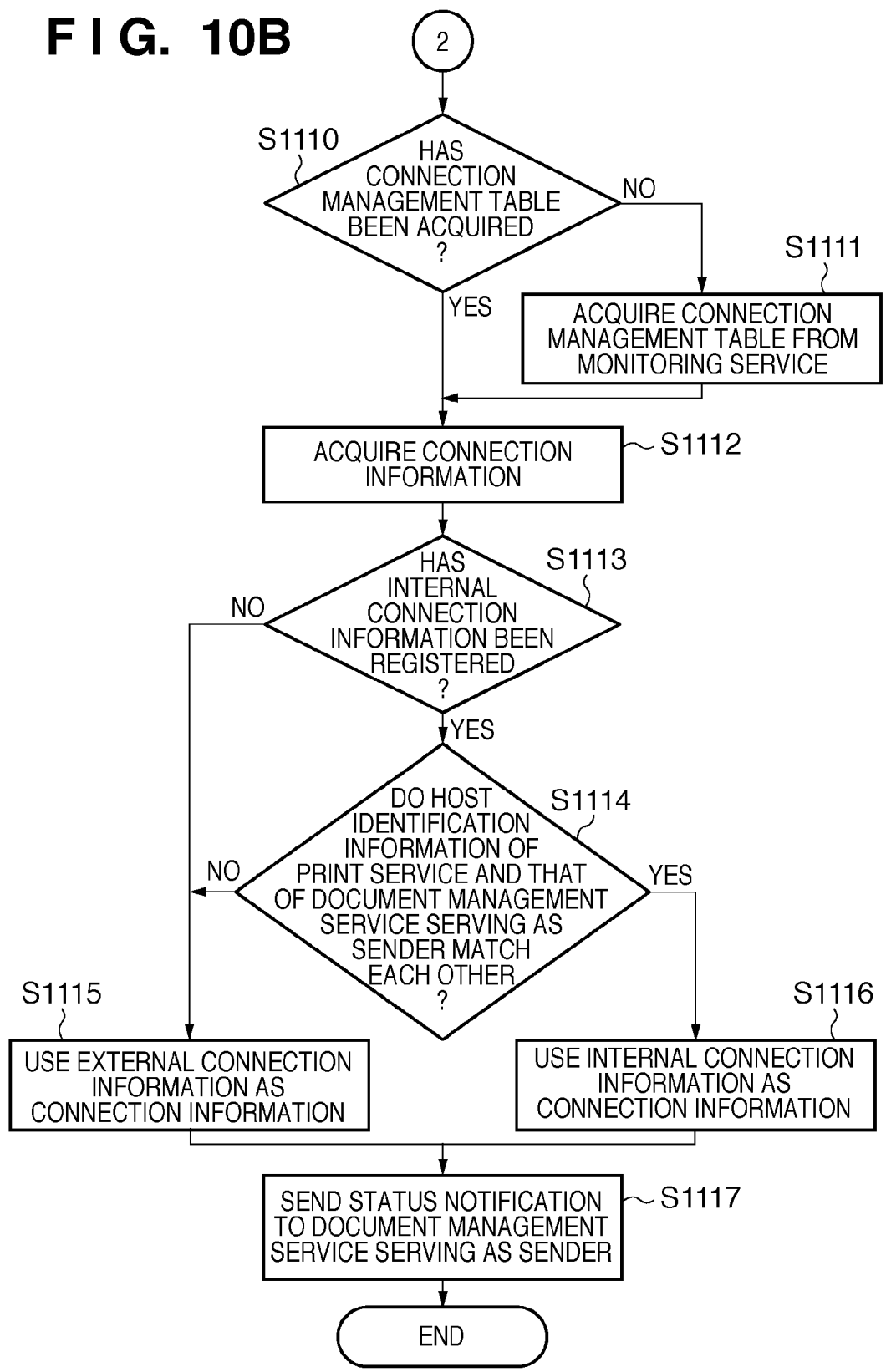

FIGS. 10A and 10B are flowcharts illustrating processing performed when the print service 60 has received a print request from the document management service 50. In the present embodiment, the control unit 602 includes a CPU, a RAM, a ROM, a HDD and the like. The procedure shown in the flowchart is stored in any of the storage units including the RAM, the ROM and the HDD of the control unit 602, and executed by the CPU 21.

In S1101, the control unit 602 receives a print request from the document management service 50. Then, in S1102, the control unit 602 stores the sender address and port in the RAM 23. Next, in S1103, the control unit 602 executes print processing. The print processing performed here is ordinary processing, and thus a description thereof is omitted here. Subsequently, in S1104, it is determined whether a change has been made to the status of the print job. If it is determined in S1104 that a change has been made to the status of the print job, in S1105, the control unit 602 updates the job identifying ID 903, the document name 904 and the changed status 905 of the print job record.

Next, in S1106, the control unit 602 determines the changed status. If it is determined in S1106 that the status is "printing", "cancellation completed" or "printing completed" (S1107, S1108 or S1109), control advances to S1110. If it is determined in S1106 that the status is none of "printing", "cancellation completed" and "printing completed", control returns to S1104. In S1110, the control unit 602 determines whether the connection management table 41 has been acquired from the monitoring service 40. If the connection management table 41 has not been acquired, in S1111, the control unit 602 acquires the connection management table 41 from the monitoring service 40, and stores the table in the connection management table cache 604. Next, in S1112, the control unit 602 specifies the document management service 50, which is a sender, from the service information 700 in the connection management table cache 604 based on the sender address and port stored in the RAM 23 in S1102. Next, the control unit 602 acquires the external communication connection address 703, the external communication connection port 704, the internal communication connection address 705, the internal communication connection port 706 and the host identifying ID 707 of the document management service 50. The control unit 602 also acquires the internal communication connection address 705, the internal communication connection port 706 and the host identifying ID 707 of the print service 60 from the service information 700 in the connection management table cache 604.

Next, in S1113, the control unit 602 determines whether or not the internal communication connection address 705 of the print service 60 and the internal communication connection address 705 of the specified document management service 50 have been registered. If both internal communication connection addresses 705 have been registered, in S1114, the control unit 602 compares the host identifying ID 707 of the print service 60 and the host identifying ID 707 of the specified document management service 50 (communication destination service module), and determines whether or not they match each other. If it is determined in S1113 that either or both of the internal communication connection addresses 705 have not been registered, control advances to S1115.

If it is determined in S1114 that the host identifying IDs 707 do not match each other, in S1115, the control unit 602 decides to use the external communication connection address 703 and the external communication connection port 704 of the print service 60 serving as a sender. The control unit 602 also decides to use the external communication connection address 703 and the external communication connection port 704 of the specified document management service 50 serving as a receiver. If it is determined in S1114 that the host identifying IDs 707 match each other, in S1116, the control unit 602 decides to use the internal communication connection address 705 and the internal communication connection port 706 of the print service 60 serving as a sender. The control unit 602 also decides to use the internal communication connection address 705 and the internal communication connection port 706 of the specified document management service 50 serving as a receiver.

Then, after processing of S1115 or S1116, in S1117, the control unit 602 sends a notification indicating the status determined in S1107, S1108 or S1109 to the specified document management service 50. The print service 60 executes print processing upon receiving a print request from the document management service 50 through the above procedure.

With the above configuration, it is possible to achieve selective use of an external network and an internal network in a virtualization environment. It is also possible to suppress communication delays and communication errors even in a system that requires exchange of a large amount of data between applications such as a high-volume printing system. It is also possible to improve the processing speed as compared to the case where the external network is used.

Second Embodiment

The first embodiment has been described in the context of the physical hosts in which virtual machines are running being fixed. As an important function in the virtualization technique, there is a function of causing a virtual machine to move from its physical host in which the virtual machine is running while continuing its service without stopping the virtual machine. This function is called "live migration". The live migration enables increasing the availability of the system. In a status in which an internal network is used for communication between services, if one of the virtual machines has moved from its host by the live migration, the communication between services will be halted. The present embodiment enables communication between services even when the live migration is performed, so that the internal network can be used for communication with a virtual machine running on a physical host to which the virtual machine has moved.

Document Management Service Processing

Figure 12B:
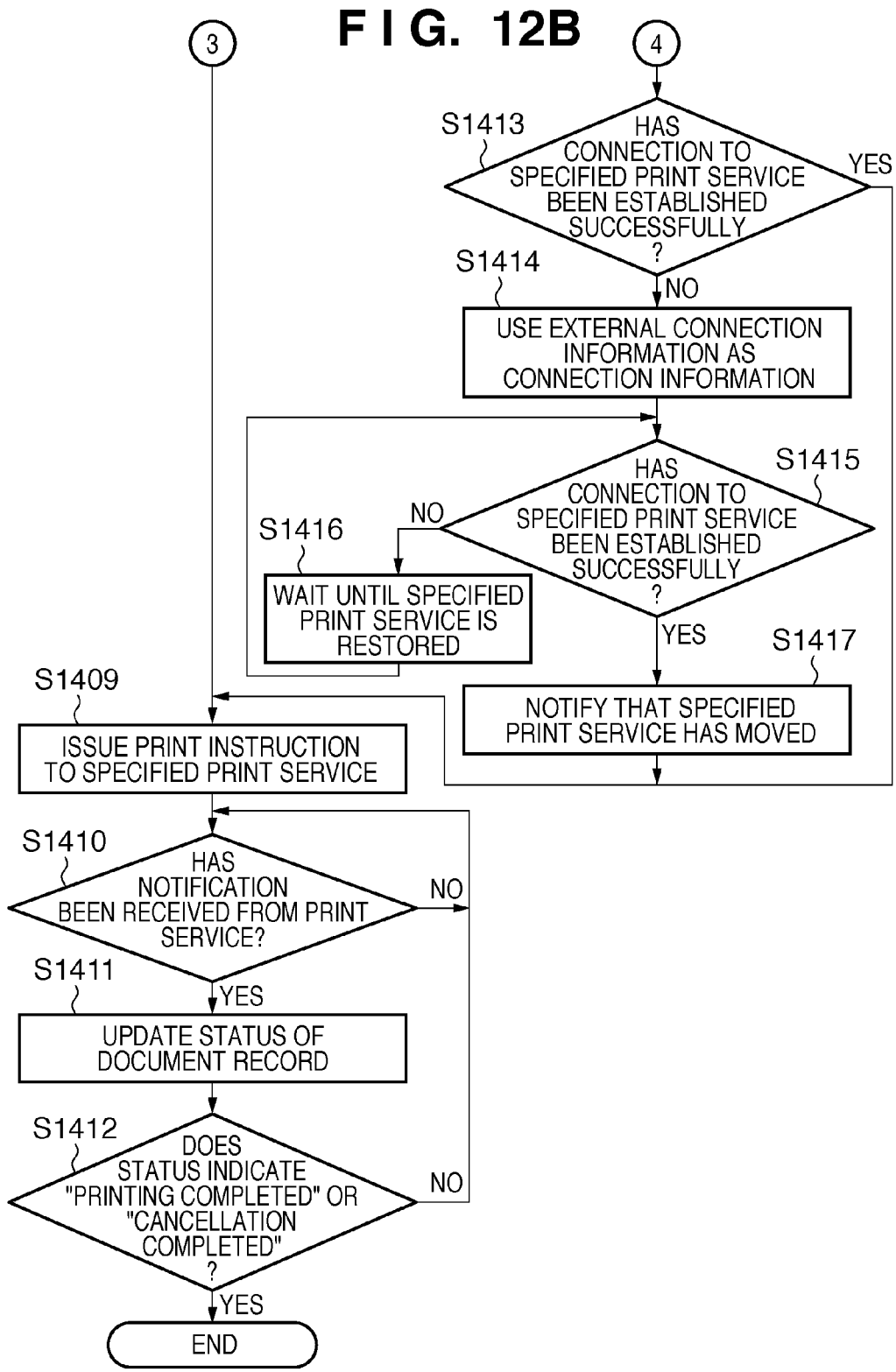

FIGS. 12A and 12B are flowcharts illustrating processing performed by the document management service 50 upon receiving a print request from the document monitor application 33 of the web server 102. In the present embodiment, the control unit 502 includes a CPU, a RAM, a ROM, a HDD and the like. The procedure shown in the flowchart is stored in any of the storage units including the RAM, the ROM and the HDD of the control unit 502, and executed by the CPU 21. The procedure is substantially the same as that described in the first embodiment with reference to FIGS. 9A and 9B, and thus only differences will be described below.

In S1408 (corresponding to S1008 of FIG. 9A), the control unit 502 decides to use the internal communication connection address 705 and the internal communication connection port 706 of the document management service 50 serving as a sender. The control unit 502 also decides to use the internal communication connection address 705 and the internal communication connection port 706 of the print service 60 serving as a receiver. Next, the control unit 502 attempts a connection to the print service 60.

Subsequently, in S1413, the control unit 502 determines whether or not a connection to the print service 60 has been established successfully. If it is determined that the connection has been established successfully, control advances to S1409. If it is determined that the connection has failed, in S1414, the control unit 502 decides to use the external communication connection address 703 and the external communication connection port 704 of the document management service 50 serving as a sender. The control unit 502 also decides to use the external communication connection address 703 and the external communication connection port 704 of the print service 60 serving as a receiver. Next, the control unit 502 attempts a connection to the print service 60.

Next, in S1415, the control unit 502 determines whether or not a connection to the print service 60 has been established successfully based on the information decided in S1414. If it is determined that the connection has failed, in S1416, the control unit 502 waits until the print service 60 is restored. The connection failure in S1415 indicates that the print service 60 is not available for some reasons, that is, the print service 60 will be restored sometime soon through execution of failover. For example, the monitoring service 40 may perform the failover.

If it is determined in S1415 that the connection has been established successfully, in S1417, the control unit 502 sends a notification indicating that the print service 60 has moved from the physical host together with the service ID 701 of the print service 60 to the monitoring service 40. Then, control advances to S1409 (corresponding to S1009 of FIG. 9B). In the present embodiment, in S1416, a configuration is employed in which the control unit 502 waits until the print service 60 is restored, but the processing may be finished as an error. Alternatively, at this time, the information decided in S1414 may be changed from the external connection information to the internal connection information decided in S1408.

Monitoring Service Processing

FIG. 13 is a flowchart illustrating processing performed by the monitoring service 40 upon receiving a notification indicating that the print service 60 has moved from the physical host from the document management service 50. In the present embodiment, the control unit 402 includes a CPU, a RAM, a ROM, a HDD and the like. The procedure shown in the flowchart is stored in any of the storage units including the RAM, the ROM and the HDD of the control unit 402, and executed by the CPU 21.

In S1501, the control unit 402 receives a notification indicating that the print service 60 has moved from the physical host. Then, in S1502, the control unit 402 specifies the print service 60 from the service information 700 in the connection management table 41 based on the service ID 701 sent together with the notification. Subsequently, the control unit 402 updates the connection management table 41 by deleting the internal communication connection address 705, the internal communication connection port 706 and the host identifying ID 707 of the print service 60. Then, in S1503, the control unit 402 sends, to all services, a notification of the internal communication connection address 705 and the host identifying ID 707 of the print service 60 together with the service ID 701 of the print service 60, and instructs them to update the connection information.

Print Service Processing

FIG. 14 is a flowchart illustrating processing performed by the print service 60 upon receiving an instruction to update the internal connection information from the monitoring service 40. In the present embodiment, the control unit 602 includes a CPU, a RAM, a ROM, a HDD and the like. The procedure shown in the flowchart is stored in any of the storage units including the RAM, the ROM and the HDD of the control unit 602, and executed by the CPU 21.

Figure 11:
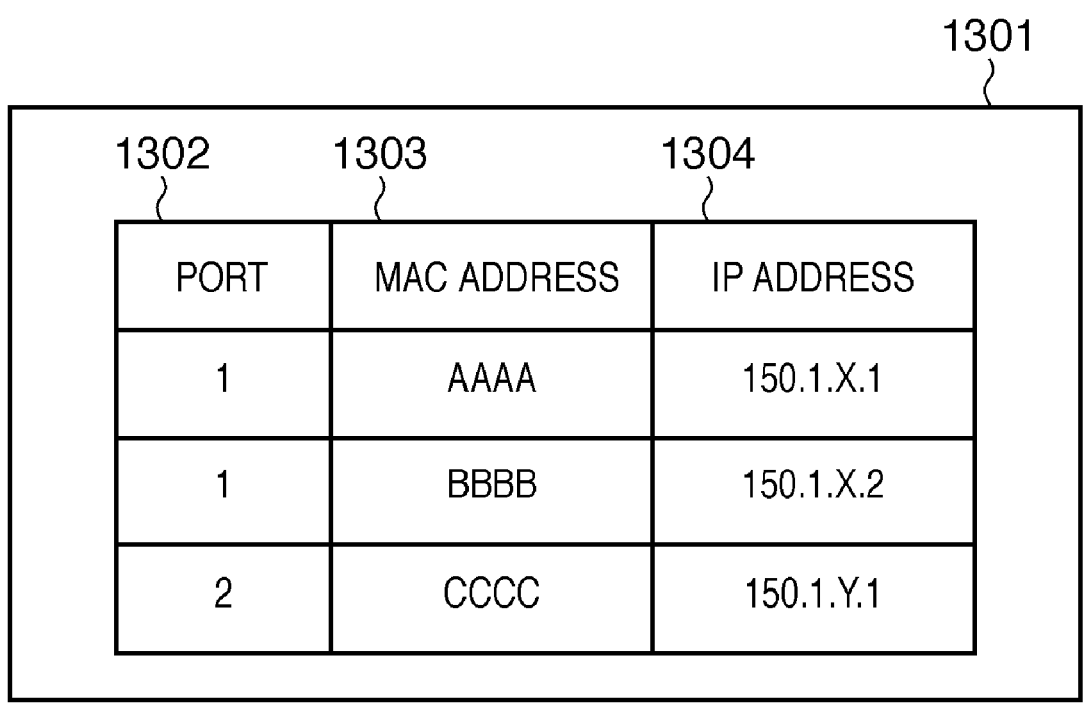
FIG. 11 shows an example of an ARP table according to a second embodiment.

In S1601, the control unit 602 receives an instruction to update the internal connection information. Then, in S1602, the control unit 602 determines whether the instruction is an instruction for the print service 60 based on the service ID 701. If it is determined in S1602 that the instruction is not an instruction for the print service 60, control returns to S1601, where the control unit 602 waits until the next instruction is received. If it is determined that the instruction is an instruction for the print service 60, in S1603, the control unit 602 acquires an ARP table from a router/switching hub or the like connected to the network 100. Most network devices such as a router/switching hub or the like hold a management information base (MIB), and are capable of acquiring information held by other network devices using a simple network management protocol (SNMP). In the present embodiment, the ARP table is acquired from a managed object ipNetToMediaTable of the standard MIB (MIB-2). FIG. 11 shows an example of an ARP table acquired. In FIG. 11, two IP addresses connect to a port 1, and one IP address connects to a port 2. However, the configuration is not limited thereto, and other specifications may be used. In addition, besides the ARP table, the information may be acquired from a device other than the network devices as long as corresponding information in which port information and information such as MAC addresses and IP addresses are associated with each other can be acquired. ps Corresponding information is thereby acquired.

In S1604, the control unit 602 searches the acquired ARP table for the external communication connection address 703 of the print service 60 to acquire an IP address connected to the same port as the external communication connection address 703 of the print service 60. In S1605, the control unit 602 determines whether there is an IP address connected to the same port as the external communication connection address 703 of the print service 60. If it is determined in S1605 that there is an IP address connected to the same port, control advances to S1606. If it is determined in S1605 that there is no IP address connected to the same port, the processing procedure ends. In S1606, the control unit 602 specifies the service of the IP address from the connection management table cache 604, and acquires connection information of the service.

Subsequently, in S1607, the control unit 602 determines whether or not an internal communication connection address 705 has been registered in the connection information acquired in S1606. If it is determined in S1607 that an internal communication connection address 705 has been registered, in S1608, the control unit 602 calculates an IP address on the same segment as the internal communication connection address 705, and sets the IP address in the virtual NIC of the print service 60. If, for example, the acquired internal communication connection address 705 is "192.168.0.100", "192.168.0.101" is calculated. If it is determined in S1607 that an internal communication connection address 705 has not been registered, the processing procedure ends.

Subsequently, in S1609, the control unit 602 determines whether the IP address calculated in S1608 is used by other virtual machine. If it is determined that the calculated IP address is already used, control returns to S1608, another IP address is calculated. If it is determined that the calculated IP address is not used by other virtual machine, in S1610, the control unit 602 decides the IP address and the host identifying ID 707 acquired in S1606 as its own internal communication connection address 705 and host identifying ID 707. The control unit 602 updates the connection management table cache 604. After S1610, in S1611, the control unit 602 sends a notification of its own internal communication connection address 705 and its own host identifying ID 707 to the monitoring service 40 together with its own service ID 701.

Monitoring Service Processing

Figure 15:
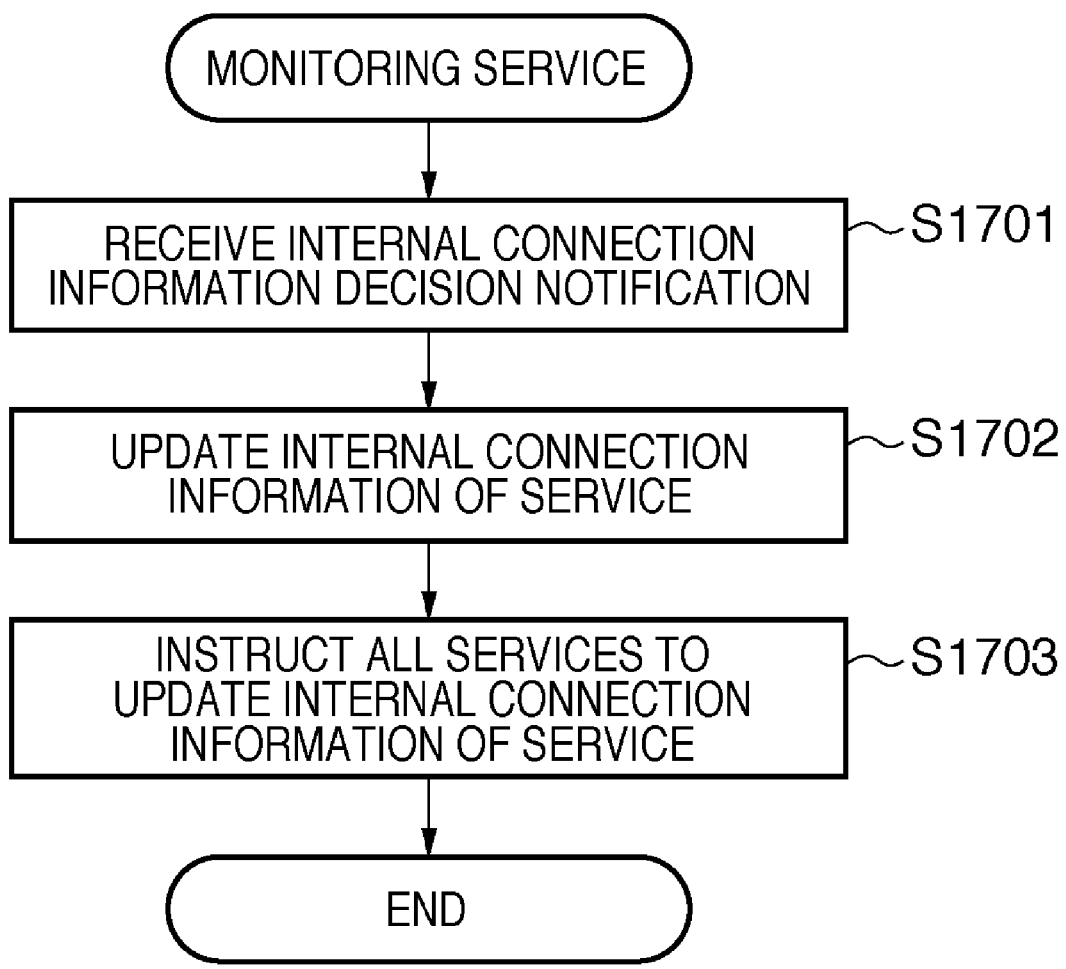
FIG. 15 is a flowchart illustrating monitoring service processing according to the second embodiment.

FIG. 15 is a flowchart illustrating processing performed by the monitoring service 40 upon receiving an internal connection information decision notification from the print service 60. In the present embodiment, the control unit 402 includes a CPU, a RAM, a ROM, a HDD and the like. The procedure shown in the flowchart is stored in any of the storage units including the RAM, the ROM and the HDD of the control unit 402, and executed by the CPU 21.

In S1701, the control unit 402 receives an internal connection information decision notification from the print service 60. After that, in S1702, the control unit 402 specifies the print service 60 from the service information 700 in the connection management table 41 based on the service ID 701 sent together with the notification. Then, the control unit 402 updates the connection management table 41 by using the internal communication connection address 705 and the host identifying ID 707 sent together with the notification. After S1702, in S1703, the control unit 402 sends, to all services, a notification of the print service 60 together with the service ID 701 of the print service 60, and instructs them to update the internal connection information. Update notification is thereby achieved.

With the above configuration, in addition to the effects of the first embodiment, even when a virtual machine has moved by a live migration, communication between services can be continued. For communication with the service operating on the destination physical host, the internal network can be used. It is also possible to perform communication between services by reducing the consumption of resources of the physical NIC to the lowest level possible while increasing the availability of the system by using the live migration.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298835, filed on Dec. 28, 2009, which is hereby incorporated by reference herein in its entirety.

The invention claimed is:

1. A communication method between service modules in a system in which service modules operating on a plurality of information processing apparatuses connected with a network operate in collaboration with each other, the system including a monitoring apparatus that is provided with a monitor module monitoring a connection between service modules in the system and that has connection management information including identifier information for uniquely identifying an information processing apparatus in which a service module is operating in the system, and connection information including external connection information for the service module to perform communication using an external network between the information processing apparatuses and internal connection information for the service module to perform communication using an internal network of the information processing apparatus, the method comprising steps of:
   acquiring, with a connection management information acquisition unit of the information processing apparatus, the connection management information from the monitor module;
   acquiring, with a connection information acquisition unit of the information processing apparatus, connection information of a communication destination service module from the acquired connection management information;
   comparing, with a comparison unit of the information processing apparatus, the identifier information of the information processing apparatus in which the service module is operating and identifier information of an information processing apparatus in which the communication destination service module is operating; and
   deciding, with a decision unit of the information processing apparatus, which of the internal connection information and the external connection information included in the connection management information to use based on a result obtained in the comparing step,
   wherein a decision is made in the deciding step to use the internal connection information to perform a communication with the communication destination service module using the internal network, if a determination is made in the comparing step that the identifier information of the information processing apparatus in which the service module is operating matches the identifier information of the information processing apparatus in which the communication destination service module is operating, and a decision is made in the deciding step to use the external connection information to perform the communication with the communication destination service module using the external network, if a determination is made in the comparing step that the identifier information of the information processing apparatus in which the service module is operating does not match the identifier information of the information processing apparatus in which the communication destination service module is operating.

2. The communication method according to claim 1, further comprising a step of determining, with a determination unit of the information processing apparatus, whether the connection management information has been acquired,
   wherein, in the connection management information acquiring step, the connection management information is acquired from the monitor module, if a determination is made in the determining step that the connection management information has not been acquired.

3. The communication method according to claim 1, further comprising a step of managing, with a table management unit of the monitoring apparatus, the connection management information,
   wherein, in the managing step, the connection information is received from the service module and the connection management information is updated.

4. The communication method according to claim 1,
   wherein, in the connection management information, the identifier information includes a host identifier, and the external connection information and the internal connection information includes Internet Protocol (IP) address and port information.

5. The communication method according to claim 1,
   wherein the service module is a print service module or a document management service module.

6. A communication method between service modules in a system in which service modules operating on a plurality of information processing apparatuses connected with a network operate in collaboration with each other, the system including a monitoring apparatus that is provided with a monitor module monitoring a connection between service modules in the system and that has connection management information including identifier information for uniquely identifying an information processing apparatus in which a service module is operating in the system and connection information including external connection information for the service module to perform communication using an external network between the information processing apparatuses and internal connection information for the service module to perform communication using an internal network of the information processing apparatus, the method comprising steps of:
   acquiring, with a connection management information acquisition unit of the information processing apparatus, the connection management information from the monitor module;
   acquiring, with a connection information acquisition unit of the information processing apparatus, connection information of a communication destination service module from the acquired connection management information;
   comparing, with a comparison unit of the information processing apparatus, the identifier information of the information processing apparatus in which the service module is operating and identifier information of an information processing apparatus in which the communication destination service module is operating;
   deciding, with a decision unit of the information processing apparatus, which of the internal connection information and the external connection information included in the connection management information to use based on a result obtained in the comparing step, determining, with a determination unit of the information processing apparatus, whether a connection to the communication destination service module in the network has been established successfully using the connection information; and notifying, with a notification unit of the information processing apparatus, the monitor module of a result of the connection to the communication destination service module, wherein a change is made in the deciding step to use the external connection information, if a decision is made in the deciding step to use the internal connection information and a decision is made in the determining step that the connection has failed, and wherein, in the notifying step, the monitor module is notified that the communication destination service module has moved from a host in which the communication destination service module is operating, if a connection has been established successfully using the external connection information.

7. The communication method according to claim 6, further comprising steps of:

updating, with a changing unit of the monitoring apparatus, upon receiving the result of the connection notified in the notifying step, the connection management information according to the received result, acquiring, with a corresponding information acquisition unit of the information processing apparatus, corresponding information in which the connection information and the information processing apparatus have been associated with each other; and specifying, with a specification unit of the information processing apparatus, another service module connected to a same port and connection information of the other service module from the corresponding information, wherein, in the notifying step, the monitor module is notified of the specified connection information.

8. The communication method according to claim 7, further comprising a step of sending, with an update notification unit of the monitoring apparatus, a notification to update the internal connection information of the service module to all service modules, if the connection information has been updated in the updating step.

9. A system including a plurality of information processing apparatuses in which service modules that operate in collaboration with a monitoring apparatus provided with a monitor module operate, wherein the monitoring apparatus has connection management information including identifier information for uniquely identifying an information processing apparatus in which a service module is operating in the system and connection information including external connection information for the service module to perform a communication using an external network between the information processing apparatuses and internal connection information for the service module to perform the communication using an internal network of the information processing apparatus, and wherein the information processing apparatus comprises:

a central processing unit (CPU) cooperating with a non-transitory computer-readable storage medium;

a connection management information acquisition unit configured to acquire the connection management information from the monitor module;

a connection information acquisition unit configured to acquire connection information of a communication destination service module from the acquired connection management information;

a comparison unit configured to compare the identifier information of the information processing apparatus in which the service module is operating and identifier information of an information processing apparatus in which the communication destination service module is operating; and a decision unit configured to decide which of the internal connection information and the external connection information included in the connection management information to use based on a result obtained from the comparison unit, wherein the decision unit decides to use the internal connection information to perform communication with the communication destination service module using the internal network, if the comparison unit has determined that the identifier information of the information processing apparatus in which the service module is operating matches the identifier information of the information processing apparatus in which the communication destination service module is operating, and decides to use the external connection information to perform communication with the communication destination service module using the external network, if the comparison unit has determined that the identifier information of the information processing apparatus in which the service module is operating does not match the identifier information of the information processing apparatus in which the communication destination service module is operating.

10. A non-transitory computer-readable medium storing a program that causes a computer to perform a method comprising steps of:

acquiring connection management information from a monitor module;

acquiring connection information of a communication destination service module from the acquired connection management information;

comparing identifier information of an information processing apparatus in which a service module is operating and identifier information of an information processing apparatus in which the communication destination service module is operating; and deciding which of internal connection information and external connection information included in the connection management information to use based on a result obtained from the comparing, wherein a decision is made in the deciding step to use the internal connection information to perform a communication with the communication destination service module using an internal network, if, based on the comparing, the identifier information of the information processing apparatus in which the service module is operating is determined to match the identifier information of the information processing apparatus in which the communication destination service module is operating, and a decision is made in the deciding step to use the external connection information to perform the communication with the communication destination service module using an external network, if, based on the comparing, the identifier information of the information processing apparatus in which the service module is operating is not determined to match the identifier information of the information processing apparatus in which the communication destination service module is operating.

11. An information processing apparatus in a system in which service modules operating on information processing apparatuses are capable of communicating, the apparatus comprising:
   a determination unit configured to determine, in a case of receiving a request from an external apparatus, whether an information processing apparatus in which a first service module that operates to initiate a processing is operating and an information processing apparatus in which a second service module that cooperates with the first service module is operating are a same information processing apparatus; and
   a communication unit configured,
   when the determination unit determines that the first processing apparatus and the second processing apparatus are not the same information processing apparatus, to control so that the first service module communicates with the second service module using external connection information that is requested for communicating with the information processing apparatus in which the second service module is operating using an external network to which a communication is performed via a physical network interface card, and,
   when the determination unit determines that the first processing apparatus and second processing apparatus are the same information processing apparatus, to control so that the first service module communicates with the second service module using internal connection information that is requested for communicating with the information processing apparatus in which the second service module is operating using an internal network to which a communication is performed without via the physical network interface card, and
   wherein the determination unit and the communication unit are formed, at least in part, by a central processing unit (CPU) cooperating with a non-transitory computer-readable storage medium.

12. The information processing apparatus according to claim 11, wherein
   the first service module is a service module for serving a document management service, and
   the second service module is a service module for serving a print service.

13. A network system comprising:
   an external apparatus that includes a transmission unit configured to transmit a request;
   a plurality of information processing apparatuses on which a plurality of intercommunicating service modules are operating, each information processing apparatus including:
   a determination unit configured to determine, in a case of receiving the request from the external apparatus, whether an information processing apparatus in which a first service module that operates to initiate a processing is operating and an information processing apparatus in which a second service module that cooperates with the first service module is operating are a same information processing apparatus; and
   a communication unit configured,
   when the determination unit determines that the first processing apparatus and second processing apparatus are not the same information processing apparatus, to control so that the first service module communicates with the second service module using external connection information that is requested for communicating with the information apparatus in which the second service module is operating using an external network to which a communication is performed via a physical network interface card, and,
   when the determination unit determines that the first processing apparatus and second processing apparatus are the same information processing apparatus, to control so that the first service module communicates with the second service module using internal connection information that is requested for communicating with the information apparatus in which the second service module is operating using an internal network to which a communication is performed without via the physical network interface card, and
   wherein the determination unit and the communication unit are formed, at least in part, by a central processing unit (CPU) cooperating with a non-transitory computer-readable storage medium.

14. A communication method between intercommunicating service modules operating on information processing apparatus in a system, the method comprising steps of:
   in a case of receiving a request from an external apparatus, determining whether an information processing apparatus in which a first service module that operates to initiate a processing is operating and an information processing apparatus in which a second service module that cooperates with the first service module is operating are a same information processing apparatus;
   when a determination is made that the first processing apparatus and the second processing apparatus are not the same information processing apparatus, controlling so that the first service module communicates with the second service module using external connection information that is requested for communicating with the information processing apparatus in which the second service module is operating using an external network to which a communication is performed via a physical network interface card, and,
   when a determination is made that the first processing apparatus and second processing apparatus are the same information processing apparatus, controlling so that the first service module communicates with the second service module using internal connection information that is requested for communicating with the information processing apparatus in which the second service module is operating using an internal network to which a communication is performed without via the physical network interface card, and
   wherein the determination step and the communication step are performed, at least in part, by a central processing unit (CPU).

15. A non-transitory computer-readable medium storing a program that causes a computer to perform a method comprising:
   in a case of receiving a request from an external apparatus, determining whether an information processing apparatus in which a first service module that operates to initiate a processing is operating and an information processing apparatus in which a second service module that cooperates with the first service module is operating are a same information processing apparatus;
   when a determination is made that the first processing apparatus and the second processing apparatus are not the same information processing apparatus, controlling so that the first service module communicates with the second service module using external connection information that is requested for communicating with the information processing apparatus in which the second service module is operating using an external network to which a communication is performed via a physical network interface card, and, when a determination is made that the first processing apparatus and the second processing apparatus are the same information processing apparatus, controlling so that the first service module communicates with the second service module using internal connection information that is requested for communicating with the information processing apparatus in which the second service module is operating using an internal network to which a communication is performed without via the physical network interface card.

* * * * *